US012639705B2

(12) United States Patent
Ness et al.

(10) Patent No.: US 12,639,705 B2
(45) Date of Patent: May 26, 2026

(54) METHODS AND APPARATUS FOR PROVABLE BACKUP CONFIRMATION FOR DIGITAL WALLETS USING KEY SHARDS

(71) Applicant: EYGS LLP, London (GB)

(72) Inventors: Benjamin J. Ness, Sugar Grove, IL (US); Anna Rittenburg, Cambridge, MA (US); Paul J. Sussex, Chester, NJ (US); Yair Frankel, Westfield, NJ (US)

(73) Assignee: EYGS LLP, London (GB)

( * ) Notice: Subject to any disclaimer, the term of this patent is extended or adjusted under 35 U.S.C. 154(b) by 174 days.

(21) Appl. No.: 18/304,955

(22) Filed: Apr. 21, 2023

(65) Prior Publication Data

US 2024/0354753 A1      Oct. 24, 2024

(51) Int. Cl.
*G06Q 20/38*          (2012.01)
*G06Q 20/36*          (2012.01)

(52) U.S. Cl.
CPC ..... *G06Q 20/3829* (2013.01); *G06Q 20/3674* (2013.01); *G06Q 20/3827* (2013.01)

(58) Field of Classification Search
CPC ........... G06Q 20/3829; G06Q 20/3674; G06Q 20/3827
See application file for complete search history.

(56) References Cited

U.S. PATENT DOCUMENTS 4,926,479 A * 5/1990 Goldwasser ....... G06Q 20/3674
                                                 713/180
10,846,372 B1 * 11/2020 Jayachandran ....... H04L 9/3239

11,831,760 B1 * 11/2023 Kaplan ................. H04L 9/0825
2015/0220928 A1 * 8/2015 Allen ..................... G06Q 20/10
                                                 705/67
2017/0048209 A1 * 2/2017 Lohe .................. G06Q 20/3829

(Continued)

FOREIGN PATENT DOCUMENTS

CN          115941163 A      4/2023
WO      WO-2024092935 A1 *  5/2024  ............. H04L 67/10
WO      WO-2024218262 A1    10/2024

OTHER PUBLICATIONS

Robin Vassantlal, et al., COBRA: Dynamic Proactive Secret Sharing for Confidential BFT Services, Jul. 27, 2022, IEEE, pp. 1335-1353 (Year: 2022).*

(Continued)

*Primary Examiner* — Nilesh B Khatri
(74) *Attorney, Agent, or Firm* — COOLEY LLP

(57)          ABSTRACT

An apparatus includes a custodial mechanism that receive, from each compute device from at a quorum, an encrypted shard associated with a private key of a digital wallet and a cryptographic proof. The encrypted shard can be generated using an encryption key for the compute device. The cryptographic proof indicates that the compute device can decrypt the encrypted shard using a decryption key associated with that compute device and without revealing a value of the private key for the digital wallet. The apparatus generates, for each compute device, a cryptographic proof verification based on the encrypted shard for that compute device and an encryption witness for the private key of the digital wallet. The cryptographic proof verification indicates that the set of shards decrypted from the set of encrypted shards can be combined to reconstruct the private key.

20 Claims, 6 Drawing Sheets

(56) References Cited

U.S. PATENT DOCUMENTS

| | | | |
|---|---|---|---|
| 2019/0318356 A1 | 10/2019 | Martin et al. | |
| 2020/0153627 A1* | 5/2020 | Wentz | H04L 9/50 |
| 2021/0083882 A1* | 3/2021 | Venable, Sr. | H04L 9/3268 |
| 2024/0283636 A1* | 8/2024 | Jen | H04L 9/3247 |

OTHER PUBLICATIONS

Kun Peng, Verifiable Secret Sharing with Comprehensive and Efficient Public Verification, Jul. 2011, HAL Open Science, pp. 1-15 (Year: 2011).*

International Search Report and Written Opinion in Intl. Application No. PCT/EP2024/060647, mailed Jul. 15, 2024, 18 pages.

Peng, K., "Verifiable secret sharing with comprehensive and efficient public verification," 23rd Data and Applications Security (DBSec), Jul. 2011, Richmond, VA, pp. 217-230.

Aumasson, Jean-Phillippe et al., "A Survey of ECDSA Threshold Signing," Cryptology ePrint Archive, 2020, 14 pages (EN abstract only).

Bin-Bin, Tu et al., "A Survey of Threshold Cryptosystems," Journal of Cryptologic Research, 2020, vol. 7, No. 1, pp. 1-14.

Brandao, L. et al., "Threshold Schemes for 3 Cryptographic Primitives: Challenges and Opportunities in Standardization and Validation of Threshold Cryptography," NISTIR, Mar. 1, 2019, 119 pages.

Desmedt, YG, "Threshold Cryptography," Encyclopedia of Cryptography and Security, Jul. 1994, vol. 5, No. 4, pp. 449-458.

Kaur, R. et al., "Survey on Different Techniques of Threshold Cryptography," IOSR Journal of Electronics and Communication Engineering (IOSR-JECE) 2017, pp. 114-119.

Sarma, K.N. et al., "A Review of Secret Sharing Schemes," Research Journal of Information Technology, 2013, vol. 5, No. 2, pp. 67-72.

Sun, X. et al., "A Survey on Zero-Knowledge Proof in Blockchain," IEEE Network, Jul./Aug. 2021, vol. 35, No. 4, pp. 198-205.

Venukumar, V. et al., "A survey of applications of threshold cryptography: proposed and practiced," Information Security Journal: A Global Perspective, Dec. 1, 2016, vol. 25, No. 4-6, pp. 180-190.

Desmedt, Y., "Threshold Cryptography". In: van Tilborg, H.C.A. (eds) Encyclopedia of Cryptography and Security. Springer, Oct. 2005, pp. 606-611.

Varghese, P. E. et al., "A Study On The Existing Threshold Cryptography Techniques," International Journal of Advanced Research in Computer Science, Sep.-Oct. 2020, vol. 11, No. 5, pp. 70-73.

* cited by examiner

400

411

BLOCK t+1

401

| ATTESTATION 404 | PUBLIC KEY INSTANCE 408 |
|---|---|
| TIMESTAMP 412 | HEADER 416 |

BLOCK t

421

BLOCK t+3

METHODS AND APPARATUS FOR PROVABLE BACKUP CONFIRMATION FOR DIGITAL WALLETS USING KEY SHARDS

FIELD

The present disclosure generally relates to the field of secret sharing and encryption. In particular, the present disclosure is related to methods and apparatus for provable backup confirmation for digital wallets using key shards.

BACKGROUND

Known digital asset custodians maintain control of digital assets on behalf of customers. To prevent loss or unauthorized transfer of digital assets, the wallet keys associated with the digital assets are protected, available and secure. Many custodians are required by regulators, external auditors, insurance companies, clients and/or others to demonstrate their contingency planning for critical events. Digital asset custodians can also receive requests to demonstrate that they have possession of wallet keys sufficient to, for example, transfer digital assets to a contingency wallet(s) should a critical disaster recovery event occur. Some digital asset custodians adopt threshold cryptography or multi-signature cryptography to distribute trust and/or use various hardware (e.g., hardware security modules, trusted execution environments (TEE), etc.) and logical controls for security.

For instance wallet solutions for both institutional and retail digital-asset investors enhance cyber protection by incorporating diversity in the digital wallet's security design by having multiple legal entities hold the secrets. This is so, at least in part, to ensure an adversary cannot access the secrets without breaking into or control multiple operating system (OS) stacks, geographic locations, admin and platform teams, hosting solutions (e.g., operating in one or more of cloud providers, data centers, hosting providers). This is oftentimes enabled by employing threshold cryptography, commonly referred to as secure multiparty computation (MPC). In both threshold cryptography and multi-signature cryptography, components that transfer assets each hold a necessary secret and are configured to be diverse from each other. A significant number of current custodial technology solutions, however, do not provide possession of all the wallet keys for day-to-day digital asset transfers. Thus, a need exists to demonstrate possession of necessary keying material.

SUMMARY

In one or more embodiments, an apparatus includes a processor and a memory operatively coupled to the processor. The memory stores instructions to cause the processor to receive, from each compute device that is from at least a quorum of compute devices, (1) an encrypted shard from a set of encrypted shards associated with a private key of a digital wallet and (2) a cryptographic proof from a set of cryptographic proofs. The encrypted shard from a compute device can be generated from a shard from a set of shards that was encrypted using an encryption key for the compute device. The cryptographic proof for a compute device indicates that the compute device can decrypt the encrypted shard using a decryption key associated with that compute device and without revealing a value of the private key for the digital wallet. The memory stores instructions to further cause the processor to generate, for each compute device from at least the quorum of compute devices, a cryptographic proof verification from a set of cryptographic proof verifications based on the encrypted shard for that compute device and an encryption witness for the private key of the digital wallet. The cryptographic proof verification indicates that the set of shards decrypted from the set of encrypted shards can be combined to reconstruct the private key for the digital wallet.

In one or more embodiments, an apparatus includes a processor and a memory operatively coupled to the processor. The memory stores instructions to cause the processor to receive, from each compute device from at least a quorum of compute devices, (1) an encrypted shard from a set of encrypted shards associated with a private key of a digital wallet and (2) a cryptographic proof from a set of cryptographic proofs and indicating that that compute device can decrypt the encrypted shard. The memory stores instructions to further cause the processor to generate, for each compute device from at least the quorum of compute device, a first cryptographic proof verification from a set of first cryptographic proof verifications based on the encrypted shard for that compute device and an encryption witness for the private key of the digital wallet. The first cryptographic proof verification indicates that the set of encrypted shards can be combined to reconstruct an encrypted private key for the digital wallet without decryption of the set of encrypted shards. The encrypted private key can be generated from a private key for the digital wallet using an encryption key for the digital wallet. The memory stores instructions to further cause the processor to generate, for each compute device from at least the quorum of compute devices, a decrypted shard from a set of decrypted shards from a decryption key for the digital wallet. The set of decrypted shards is periodically distributed among at least the quorum of compute devices. The memory stores instructions to receive, from each compute device from at least the quorum of compute devices, a second cryptographic proof from a set of second cryptographic proofs indicating that the set of decrypted shards can reconstruct the decryption key for the digital wallet. The memory stores instructions to further cause the processor to generate, for each compute device from at least the quorum of compute devices, a second cryptographic proof verification from a set of second cryptographic proof verifications based on the second cryptographic proof for that compute device and indicating that the encrypted private key for the digital wallet can be decrypted using the decryption key that was reconstructed using the plurality of decrypted shards.

In one or more embodiments, a non-transitory, processor-readable medium stores instructions that when executed by a processor, cause the processor to receive, from each compute device that is from at least a quorum of compute devices, (1) an encrypted shard from a set of encrypted shards associated with a private key of a digital wallet and (2) a cryptographic proof from a set of cryptographic proofs. The encrypted shard of a compute device is generated from a shard from a set of shards that was encrypted using an encryption key for that compute device. The cryptographic proof for that compute device indicates that that compute device can decrypt the encrypted shard from the set of encrypted shards and for that compute device using a decryption key associated with that compute device. The memory stores instructions to further cause the processor to generate, for each compute device from at least the quorum of compute devices, a cryptographic proof verification from a set of cryptographic proof verifications based on the encrypted shard for that compute device and an encryption witness for the private key of the digital wallet. The cryptographic proof verification for a compute device indicates that the set of shards decrypted from the set of encrypted shards can be combined to reconstruct the private key for the digital wallet. The memory stores instructions to further cause the processor to transmit a notification including the set of cryptographic proof verifications to at least the quorum of compute devices. The memory stores instructions to further cause the processor to receive a reconstructed private key generated from the set of shards from at least the quorum of compute devices to verify that the reconstructed private key is associated with the public key of the digital wallet.

DETAILED DESCRIPTION

Figure 1:
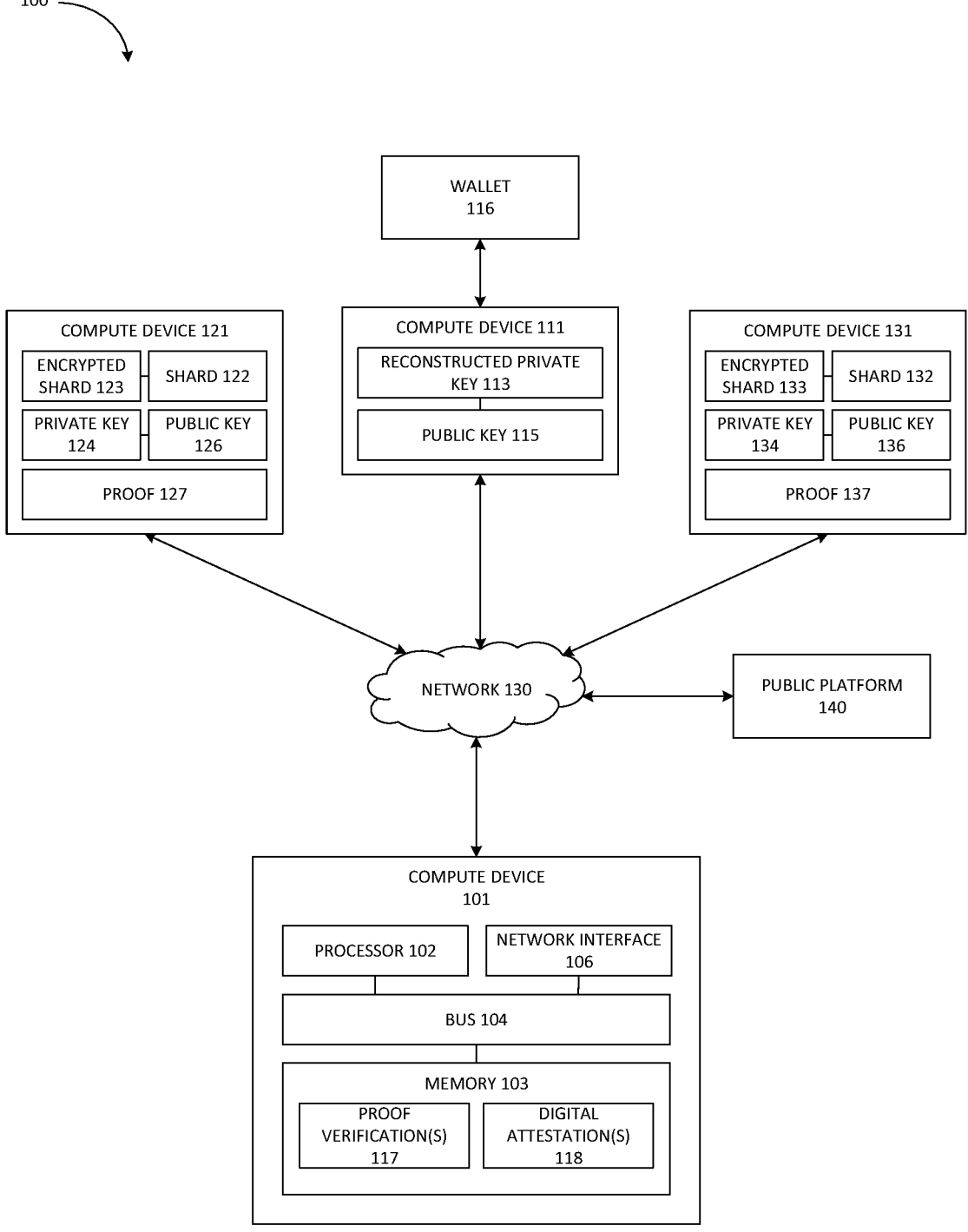
FIG. 1 is a diagrammatic illustration of a system for provable backup confirmation of a private key for a digital wallet using key shards, according to one or more embodiments.

In some embodiments, an apparatus can perform and/or facilitate reconstruction of wallet secrets (also referred to herein as "wallet private keys" or "private key(s) of a wallet") based on a minimum requirement of key shards (also referred to herein as "shards") and/or key shareholders (also referred to herein as "shardholders") to demonstrate sufficient knowledge of cryptographic materials. The apparatus can verify, attest, and/or re-organize a structure of a digital wallet (also referred to herein as "wallet"). The apparatus can be or include a custodian that can define (or derive) mechanisms for which a digital wallet owner can prove to itself and to other entities that digital wallet owner has (or access to) necessary information to recover the secret for the digital wallet. For context, regulated crypto custodians are ultimately responsible for assets for which they hold custody and should demonstrate that they have sufficient knowledge of the cryptographic material necessary to transfer assets.

In some embodiments, the apparatus can enhance methods to demonstrate possession of the keying material for backup of custodial assets. For instance, the apparatus can securely obfuscate cryptographic keys and prove possession of the cryptographic key to decrypt the cryptographic keys. In some implementations, the apparatus can also convert encrypted shards of a wallet private key to a single encryption of the wallet private key(s) using shards of a decryption key. In some implementations, the apparatus can timestamp proofs of possession of the wallet private key(s) and/or shards of the wallet private key(s). In some implementations, the apparatus can incorporate a trusted party (e.g., an attestation agent) to attest to the context of the proofs of possession of the wallet private key(s) and/or shards of the wallet private key(s). In some implementations, the apparatus can also prove possession of reconstructed wallet private key(s).

Note that it is not uncommon for custodians to have secrets across multiple (legal) entities and or technology infrastructures to reduce risk of single point of attack that could compromise the secrets. Additionally it is not uncommon to have at least a portion of the secrets residing on a Trusted Execution Environment (TEE), which limits the access to the secrets. In some implementations, diversity can be added to custodial technology solutions to increase the security of day-to-day operations. This is so, at least in part, such that an adversary may need to compromise more than one operating system and/or hosting environment (e.g., AWS®, Azure®, GCP®, data center, third-party hosting provider, etc.) to have access to the secrets.

In some embodiments, the apparatus can perform and/or facilitate various secret sharing schemes. In other words, the apparatus can generate and/or distribute shares of secrets using secrets sharing schemes. Secret sharing schemes are cryptographic techniques used to split a secret (e.g., wallet private key) into multiple shares (also referred to herein as "shards"), such that the secret can only be reconstructed by combining a predetermined minimum number of shards. In some secret sharing schemes the shares can be generated distributively and can combined to generate a secret. In other words and in some cases, the shares are not derived from an original secret. The multiple shards can be distributed to multiple entities (shardholders) and each shard can be further divided and distributed. Secret sharing schemes can be used to provide security and resilience in situations where a single, similarly less than a quorum, point of failure or access control is undesirable, such as, for example, in the case of cryptographic key management or access control systems. By splitting a secret into multiple shards and distributing them among different individuals or entities, the risk of the secret being compromised can be reduced. In a typical secret sharing scheme, a secret can be divided into n shards, and a threshold value/is set such that the secret can only be reconstructed by combining/or more shards. When the secret is to be reconstructed to access digital assets locked behind the secret, when an owner of the secret has lost access to the secret, when the secret is damaged and/or accidentally deleted, or when one or more entities owning one or more shards is compromised, a minimum of/shards are used to reconstruct the original secret. For instance, shardholders holding shards can be instructed to reconstruct the secret such that the reconstructed secret can be provided to the owner of the secret that was lost. This is so, at least in part, such that the owner of the reconstructed secret does not have to request shardholders to perform secret sharing schemes to reconstruct the secret every time the owner desires to access assets locked behind the secret. Secret sharing schemes can be designed (or configured or implemented) to provide additional security features, such as the ability to revoke individual shards in the event of a security breach. This is so, at least in part to provide, for example, protection of sensitive information, key management, asset access control, and/or data protection without disruption. Additionally, the secret sharing schemes enabled by the apparatus can be retroactively integrated into existing solutions.

In some implementations, the apparatus can facilitate, among compute devices, a secret sharing scheme such as, for example, a Shamir's secret sharing scheme (also referred to herein as "Lagrange interpolation"). The Shamir's secret sharing scheme is a cryptographic algorithm used to distribute a secret among a group of participants, where each participant holds a shard of the secret. The secret is divided into shards (shares), and each participant is given a shard of the secret. The shards can be calculated such that a subset of participants above a threshold of participants can combine their shard s to reconstruct the secret. If a subset includes fewer participants than the threshold of participants, the subset is ineligible to reconstruct the secret. This is so, at least in part, such that the secret is shared securely, even if some participants are untrusted or compromised. The Shamir's secret sharing scheme can be implemented in MPC, secret backup, secret recovery, and/or the like.

For instance, a secret sharing scheme can be a protocol $P=\{K, S, Q, D(\bullet), C(\bullet)\}$ where S is a set of shareholders (also referred to herein as "shardholders"). D is a shard distribution protocol for $S=\{i_1, \ldots, i_l\}$ is a set of l shardholders, $Q=\{Q_1=\{i_{1,1}, \ldots, i_{1,c_1}\}, \ldots Q_k=\{i_{k,1}, \ldots, i_{k,c_k}\}\}$ where $Q_v \subseteq S$ is a set of quorums and $c_v \subseteq |Q_v|$ is the cardinality of $Q_v$, such that for any $k \subseteq K$, $D(k)=\{s_{i_1}, \ldots, s_{i_l}\}$ distributes shards $s_{i_j}$ to shardholder $i_j \in S$, and for all $Q_v=\{i_{v,1}, \ldots, v_{v,c_v}\} \in Q$, $C(s_{v,1}, \ldots, s_{v,c_v})=k$.

The Shamir's secret sharing scheme is a (t, l) threshold scheme for which $|S|=l$ and $|Q_v|=t$ for all $Q_v \subseteq Q$. In the Shamir's secret sharing scheme, to generate shards, let $GF(P^n)$ be, for example, a Galois field. For a prime number P and integer n>0, let $k \in GF(P^n)$ be a secret, and $x_{i_1}, \ldots, x_{i_l}$ be elements in $GF(P^n)$ which represent a unique identifier of $i_n \in GF(P^n)$. To regenerate the secret using the shards, let $F(x)$ be a t–1 degree polynomial such that $F(0)=k$. For $B=\{x_1, \ldots, x_t\}$, $$k = F(0) = \sum_{x_i \in B} F(x_i) \cdot y_{i,B} \in GF(P^n), \text{ where}$$

$$y_{i,B} = \prod_{x_j \neq x_i, j \in B} (0 - x_j)(x_i - x_j)^{-1}$$

In some implementations, the secret sharing scheme can be or include a robust secret sharing scheme. A robust secret sharing scheme is a variant of secret sharing that can dynamical rotate shards to new values while maintaining the same secret. Robust secret sharing schemes can be designed to be resilient to malicious or colluding participants that may attempt to disrupt or compromise the sharing process. The apparatus can enable robust secret sharing such that multiple systems, which may or may not include shardholders, can generate initial shards and thereby reconstruct a secret. For instance, the secret can be generated distributive amongst a subset of $\overline{S_0}=\{S_1, S_2, \ldots, S_n\}$ where 0 represents at time at 0, $\overline{S_{h,0}}=\{S_{h,1}, S_{h,2}, \ldots, S_{h,n_h}\}$ represents the shardholders at the h iteration, and $t_h$ represents the quorum at the h iteration. At a later time, shardholders may want to "randomize" and/or "rotate" newly generated shards. Thereby, should a shardholder be added, removed, and/or was compromised, newly generated shards can be distributed while being able to reconstruct the original secret. A subset of the $S_{h,i}$ can be called the generating subset. For h=0, each shardholder can generate its individual random shard $\overline{s}_{0,i} \in {}_R Z_P$. For h>0, $s_{h,i}=s_{h-1}$, i, each $S_i$ can generate a random t–1 degree polynomial $f_{h,i}(x)=a_{h,i,t-1}x^{t-1}+\ldots+a_{h,i,0}$ such that $\overline{s}_{h,i}=f_{h,i}(0)$. Each of the generating subset $S_i$ can then publish a blinded commitment of coefficients of the polynomial to perform a verifiable secret sharing (e.g., Pederson commitment

6

$G^{a_{h,i,j-1}}z^{r_{h,i,t-1}}$ for a random $r_{h,i,t-1} \in {}_R Z_P$ and z a generator). Each Shi can then securely transmit $s_{h,i,j}$ to system $S_{n,j}$. In some cases, the system $S_i$ can also be referred to herein as "quorum." Upon receipt of all shards $s_{h,i,j}$, each system j can verify its shard against the Pederson commitments as part of the verifiable secret sharing, perform a verifiable secret sharing dispute process if necessary, and generate new shard $s_{h,j}=\Sigma_i s_{\{h,i,j\}}$ for all i that were part of the initial subset to generate the secret. The shard $s_{h,j}$ is the shard for $S_{h,i}$ at iteration h of the secret. In a similar manner, by changing parameters (e.g., the number of shardholders and the quorums) and or changing recipients of new shards, a dynamic secret sharing scheme is possible. The dynamic secret sharing scheme enables an access structure of a quorum of participants to be modified. In other words, a custodian can change a particular access structure of the quorum and/or allow the participants to reconstruct different secrets at different time instants (Sarma et al. (2013) "A Review of Secret Sharing Schemes," Research Journal of Information Technology, 5 (2): p. 67-72).

In some embodiments, the apparatus can generate shards and/or facilitate the generation of shards for any quorum of participants (e.g., shardholders). For n shardholders there may be a multitude of quorums for which any shardholder can be a member. For instance, let G be an algebraic structure (such as a group) for which a discrete log is computationally difficult (i.e., it is not computationally possible to determine x from $G^x$ and G). It is important to note that although the above discrete log problem is defined as multiplicative, i.e., $G^x=G \times G \times \ldots \times G$, some algebraic structures can be represented additively. Such as for elliptic curves, the discrete log problem can represented as determining x from $x \cdot G=G+G+\ldots+G$. Without loss of generality, multiplicative form can be used. Let $P=ord(G)$ be the cardinality of the cyclic group generated by G. In some cases, P can be a prime value. In some implementations, the quorum $\overline{S}=\{S_1, S_2, \ldots, S_n\}$ can consist of n compute devices, each compute device possessing individual shards $\{s_1, s_2, \ldots, s_n\}$. The quorum can be operating as a distributed cryptographic operation such as a Threshold Cryptosystem, MPC (secure Multiparty Computation), and/or the like. The shards can be generated from a secret and can be used to reconstruct the secret. Let the secret be $k=\Sigma_{\{i=1 \ldots n\}} s_i \in Z_P$. The secret can be a private key of a digital wallet in which the private key is associated with a public key. In some implementations, the public key can be part of an asymmetric cryptographic key pair. The public key $G^k$ can be made public. In some implementations, the apparatus (e.g., verifier) can receive the public key and use it to verify knowledge of a shard that each compute device of the quorum has possession of. In some implementations, the apparatus can enable, facilitate, and/or produce backup shards. Backup shards can be new shards generated from a shard used to reconstruct a secret. The backup shards can be used to reconstruct the shard used to reconstruct the secret. The backup shards can further be distributed, divided, and/or rotated, periodically, among existing compute devices in the quorum and/or new compute devices not originally part of the quorum. For instance, each $S_i$ can generate a random encryption key $e_i \in {}_R Z_P$ and published (or enables publishing of) $G^{e_i}$, $R_i=s_i+e_i \in Z_P$, and a proof of knowledge of $e_i$ from witness $G^{e_i}$. The apparatus can confirm $G^{R_i}==G^k \Pi_{i=\{1 \ldots n\}} G^{e_i}$ where the apparatus knows $G^k$.

In some embodiments, it is common for institutional custodians to employ complex access structures rather than the threshold scheme, which incorporates diversity to enhance security and availability. A general access structure can be implemented to force an adversary to require shards from different operating systems and or hosting environments (e.g., Azure®, AWS®, GCP®, etc.). The general access structure can be implemented using a $c_v$ out of $c_v$ scheme for each quorum $Q_v \in Q$. For instance, in a general access structure, to generate shards from a secret, let $K(\bullet)$ be a finite group and let $k \in K$ be a secret. For each $Q_v \in Q$, random shards $s_{v,j}' \in_R K$ can be generated for $0 < j < c_v$ and $s_{v,j}' \equiv k \cdot (\Sigma_{0 < j < c_v} s_{v,j}')^{-1}$. To regenerate the secret, for all $Q_v \in Q$, $k = \Sigma_{0 < j < c_v} s_{v,j}'$. Note, in a Shamir threshold scheme that $s_{v,j}' = s_i \cdot y_{iB}$ where $Q_v = B$ and $|Q_v| = t$.

In some embodiments, the secret sharing scheme can include several extensions available to digital wallets. For instance, secrets can be generated distributivity to at least a quorum of participants without the trust of a central authority. Shards of a secret of a secret sharing scheme (e.g., MPC) can be randomized such that a new set of shards to the secret can be produced. In some cases, the new set of shards can be distributed among the same quorum of participants. In some cases, the new set of shards can be distributed among some of the participants of the quorum and new participants. In some cases, the new set of shards can be rotated and/or redistributed periodically. In some cases, the access structure of the quorum of participants can be modified.

In some embodiments, the apparatus can be or include a verifier and/or a custodian such that a shardholder holding a shard of the secret may be required to prove to itself, other shardholders (or entities), and/or to the apparatus that the shardholder owns the shard and that the shard is valid. In some implementations, the shardholder can generate a proof of knowledge (also referred to herein as "cryptographic proof"). The proof of knowledge can be a cryptographic protocol that enables a prover (e.g., shardholder) to convince the verifier (e.g., central authority, custodian, and/or the like) that the shardholder possesses some knowledge about a shard of the secret owned by that shardholder without revealing information about that knowledge beyond what is necessary to prove possession of it. The proof of knowledge can be constructed such that the proof cannot be forged and/or falsified by an adversary that does not possess the knowledge. This is so, at least in part, to ensure security of the secret sharing scheme, as it prevents malicious participants from falsely claiming to hold a shard of the secret and potentially disrupting the secret sharing process. In some implementations, proof of knowledge protocols can also be used to verify authenticity of participants that claim to possess ownership of shards of a secret via a distributed ledger such as, for example, a blockchain. For example, in an MPC protocol, each participant can prove that they have contributed a valid shard of the secret without revealing that secret to other parties. In some implementations, the proof of knowledge can be or include a cryptographic proof such as, for example, a zero-knowledge proof (ZKP). The ZKP can be used to ensure that each participant is able to reconstruct the secret using their shard of the secret without revealing the secret itself.

In some implementations, the apparatus can use, for example, a non-interactive ZKP of discrete logarithm to verify provenance of knowledge of a shard. The ZKP is non-interactive as it does not require any back-and-forth communication between the prover (e.g., shardholder) and verifier (e.g., the apparatus, blockchain, blockchain network, verifying agent, and/or the like). In some cases, participants that demonstrate their knowledge of a secret and/or shard of the secret without revealing information about the secret and/or shard can be referred to as "witnesses." For witnesses $G^x$, $G$, a prover (e.g., participant and/or shardholder that has not yet proven knowledge of secret/shard) can generate GT for a random r, where r is between 0 and P (i.e., order of group generated by G). The prover can generate $c = \text{Hash}(G^x, G^r, \text{other\_info})$, where other_info can include, for example, timestamp information. This is so, at least in part, because by incorporating a timestamp, which could have been only generated after a specific time, the ZKP is guaranteed to have also been created after the timestamp, and thus verifying knowledge of the secret and/or shard of the secret. The prover can then send GT, other_info, $z = cx + r \in Z_P$, and/or the like to the apparatus. The apparatus can then confirm $G^z = (G^x)^c G^r$ from the witness and based on the prover's provided data. In some implementations, the apparatus can perform operations over an elliptic curve E. This is so, at least in part, as most blockchain implementations use elliptic curves for computation and storage efficiency.

In some implementations, proofs (e.g., ZKPs) from shardholders can be used to prove that shardholders are able to reproduce shards (or backup shards), similarly, to reproducing the secret. In some cases, shardholders can be required to demonstrate the ability to reproduce periodically for consistency. For instance, a shardholder can produce a ZKP to demonstrate knowledge of a shard. The ZKP can be generated off-chain. The apparatus can verify the ZKP in which the shard can be committed (or indication of the shard) to a blockchain by including a reference to that shard and that ZKP in a transaction or block. In some implementations, the apparatus or the shardholder can make the commitment to the blockchain. The block can contain a hash generated by the shardholder containing information such as, for example, identify of the shardholder (e.g., public key), the shard or information about the shard, randomly generated numbers used to generate the ZKP, and/or other coefficients or polynomials used in a secret sharing scheme. The block can also include a timestamp indicating the time at which the block was created. The apparatus can use the timestamp in the block on the blockchain to confirm that the shard was generated and/or committed to the blockchain at a certain point in time in the past to prove that the shardholder had knowledge of the shard at that time. In other words, the timestamp ensures when verification and/or testing of knowledge of shard occurred. As such, the ZKP (or some proof of knowledge) can be made public. The proof can be published on the blockchain or some public forum in which the published information can include, for example, $G^{e_i}$, $R_i = s_i + e_i \in Z_P$, and the proof of knowledge of e; from witness $G^{e_i}$. To recover shards, each $S_i$ can output $s_i = R_i - e_i \in Z_P$ or provide $e_i$ for someone else to compute $s_i$.

In some implementations, the apparatus can use Shamir's secret sharing scheme (LaGrange interpolation) in which a quorum $\overline{S} = \{S_1, S_2, \ldots, S_n\}$ consists of n compute devices in which each compute device possesses individual shards $\{s_1' = (1, f(1)), s_2' = (2, f(2)), \ldots, s_n' = (n, f(n))\}$. The quorum may be operating as a distributed cryptographic operation such as a Threshold Cryptosystem, MPC (secure Multiparty Computation). In this case, $k = f(0) = \Sigma_{i \in \{i_1, \ldots, i_t\}} f(i) \cdot (\Pi_{j \neq i, j = \{i_1, \ldots, i_t\}} (0 - x_j)(x_i - x_j)^{-1} \in Z_P$. Using the LaGrange interpolation, the apparatus can facilitate and/or generate backup shards. For instance, each $S_i$ generates a random encryption key $e_i \in_R Z_P$ and publishes, $G^{e_i}$, $R_i = s_i' + e_i \in Z_P$, and a proof of knowledge of et from witness $G^{e_i}$. The apparatus can confirm $\Pi_{i = \{1, \ldots, n\}} (G^{-e_i} G^{R_i})^{L_{j,Q}} = G^k$ where $L_{j,Q} = \Pi_{j \neq i, j = \{i_1, \ldots, i_t\}} (0 - x_j)(x_i - x_j)^{-1}$ and $Q = \{i_1, \ldots, i_t\}$.

In some embodiments, a shareholder can prove knowledge of possession of a secret for the custodian via threshold scheme by encrypting discrete log values. In other words, the apparatus can perform an encryption mechanism that calculates the logarithm of a value associated with a secret and encrypt it using a cryptographic algorithm. This is so, at least in part, because secrets and/or shards can be encrypted in which knowledge of the encrypted secrets and/or encrypted shards is also required. Secrets and/or shards can be encrypted via an encryption function $E[n](m)=n+m\in Z_{ord(G)}$ where m is a message and $n\in Z_{ord(G)}$ is the encryption key (similarly decryption key). The encryption function can be extended to $E[n](k)=k*G+n*G$ where k is a shard and/or secret for a digital wallet. The secret can also be referred to herein as "wallet key." The secret can be a private key of the digital wallet. As such, in some cases, a key encrypting key (KEK) scheme can be used where n is the encryption/decryption key used to encrypt (or decrypt) the wallet key m. Furthermore, in a wallet system, a public key of a digital wallet $k*G$ is known or easily accessible to potential adversaries. As such, the encryption function $E[n]$ (m) can no longer be used as a one-time pad (i.e., encryption scheme with the encryption key only being used once). The encryption mechanism can be used to encrypt wallet keys for single key wallets, wallet keys for multi-signature wallets, and/or shards for threshold cryptosystems.

In some embodiments, shardholders can encrypt shards and/or keys and subsequently prove encrypted shards and/or encrypted keys are created appropriately. In other words, the shardholders (e.g., provers) prove that they have knowledge of the shards/keys and/or encrypted shards/keys that can reconstruct wallet keys and prove that they have knowledge of decryption keys, which enable regeneration of shards/keys and/or encrypted shards/keys. For instance, proving knowledge of shards/keys includes providing proof that contain knowledge of the shards/keys at the time of the creation of the proof.

Proving possession of secrets and/or shards can include protocols such as, for example, a general access system and Shamir's secret sharing scheme. For instance, in a general access system, let secret $k=\Sigma_{0<h\le c_v}s_{v,j}'$. For each $Q_v\in Q$, each shard $s_{v,j}'$ is encrypted as $E[n_{v,j}'](s_{v,j}')$. Then, for each $Q_v\in Q$, a shardholder publishes at least one of $(n_{v,j}')*G$ and $(s_{v,j}')*G$. The apparatus can derive $(n_{v,j}')*G$ and $(s_{v,j}')*G$ as necessary. The shardholder can perform and/or generate a proof of knowledge. For example, the shardholder can generate a proof of a decryption key that the shardholder has possession of $n_j'$ with witness $n_j'\cdot G$. The shardholder can also perform and/or generate a proof of knowledge of a shard $s_{v,j}'$ from $s_{v,j}'\cdot G$. The apparatus can then confirm $k*G=\Sigma_j s_{v,j}'*G$ for at least one of $Q_v\in Q$.

In proving possession of secrets and/or shards, for a Shamir's secret sharing scheme, $s_{v,j}'=s_i\cdot y_{iB}$ where $Q_v\equiv B$ and $|Q_v|=t$. The value of $y_{iB}$ does not require knowledge of shards/keys. In the Shamir's secret sharing scheme, each shardholder i can encrypt $(s_i)$ as $E|n_i|(s_i)$. Each shardholder i can then publish $(n_i)*G$ or $(s_i)*G$. The apparatus can derive $(n_{v,j}')*G$ and $(s_{v,j}')*G$ as necessary. The shardholder can perform at least one of two proofs of knowledge including a proof of a decryption key that the shardholder that proves knowledge of $n_j$ or a proof of knowledge of a shard $s_i$. The apparatus can confirm $k*G=\Sigma_{i\in B}y_{i,B}(s_i*G)$ for at least one of $Q_v\in Q$.

In general access system and Shamir's secret sharing scheme as described above for proving possession of secrets/shards can include individual shards being encrypted. Due to the homomorphic nature of $E(\cdot)$, instead of holding encryptions of multiple shards, the apparatus can hold encryption of secrets related to the digital wallet. In other words, the apparatus can convert encrypted shards to encrypted keys (e.g., encrypted wallet keys). For instance, instead of storing each $E(s_{v,j}')$ for all j and v, the apparatus can perform the conversion for any $Q_v$ storing only $k+\Sigma_j n_{v,j}'$. This is also possible in a Shamir's secret sharing scheme. For instance, any t shardholders in B can encrypt their shards as $S_i=s_i\cdot y_{i,B}+n_{i,B}''$ (which implies $\Sigma S_i\equiv k*G+(\Sigma_{i\in B}n_{i,B}'')*G$. Each $i\in B$ can then share $n_{i,B}''$ with all other shardholders. Since Shamir's secret sharing scheme is a homomorphic secret sharing scheme, each shardholder can combine their shards to reconstruct the secret, thereby the scheme is now $E(\Sigma_j n_{i,B}'')[k]$ where $n_{i,B}''$ is shared across all shardholders. It is to be understood that the apparatus can perform/facilitate secret sharing and/or proving possession of a secret and/or shards can include any protocols for secret sharing and/or proving possession of a secret/shard other than general access structure or Shamir's secret sharing scheme (e.g., Lagrange).

The protocols described above for proving knowledge are not always time dependent. Interactive proofs are associated to the time of provenance, however, a non-interactive proof, as described previously, does not provide cryptographic timing of proof. In the instance that requests to prove knowledge of shard/secret and/or ability to reconstruct shard/secret occurs, a timestamp can be used to ensure when a proof occurred. This is so, at least in part, to reduce back-and-forth communication between provers and verifiers and rely on a secure identifier to validate proofs. For instance, for a non-interactive proof (e.g., ZKP), the apparatus can incorporate a timestamp TS, such that a hash can be committed in a ZKP protocol using the timestamp.

In some implementations, the apparatus (e.g., custodian) can be configured to implement one or more protocols such as, for example, a general access system and Shamir's secret sharing scheme to multiple parties in verifying provenance of knowledge of secrets/shards, backup of secrets/shards, and/or decryption of encrypted secrets/shards. The apparatus can also make proofs received from the parties publicly available. In some embodiments, the apparatus can provide the protocols and make proofs public without publishing a public key associated with a private key (e.g., secret) of a digital wallet. For instance, the apparatus can obfuscate the public key and provide a proof based on the obfuscated data. For example, the apparatus can obfuscate $k\cdot G$ to a value $k\cdot(q\cdot G)$ with base $q\cdot Q$ where $q\in_R Z_{ord(G)}$.

In some cases, although obfuscating secrets can be beneficial in hiding the public key, on its own, a proof may not be meaningful to a verifier. For instance, the proof can be a proof of knowledge to a secret but not necessarily the secret for which the verifier is interested in. In some implementations, the apparatus can use a digital attestation from an attestation agent to attest to a linkage of the proof to the public key of the digital wallet that is of interest. In other words a proof that demonstrates validity to a public key may not be related to the public key of the digital wallet of interest. The digital attestation can indicate that a public key in a proof is directed to the public key of the wallet via publication of the digital attestation to a public forum. In some implementations, the digital attestation can be, for example, a digital signature generated via a public key (certification) of the attestation agent. For example, the digital attestation can include a digital signature of name of the owner of the digital wallet, context of the wallet (e.g., hot, cold wallet), timestamp, and/or the like.

In some embodiments, the protocols performed by the apparatus can be implemented in a compute device that owns a digital wallet, such that that compute device, now a custodian, can perform secret sharing schemes for generating backup secrets and/or shards with other compute devices.

In some embodiments, the apparatus can receive encrypted shards from at least a quorum of compute devices (e.g., custodians) to reconstruct a private key for a digital wallet. In some cases, the custodian of the digital wallet can be included in the at least a quorum of compute devices to participate in secret sharing to reconstruct the private key. In some implementations, the private key can be divided into multiple shards that were distributed to various compute devices. This is so, at least in part, to enhance security of the private key such that a compromise with a single custodian does not compromise the private key for the digital wallet. Alternatively or additionally, the apparatus can supervise, oversee, and/or facilitate secret sharing among participants in an MPC environment.

FIG. 1 is a diagrammatic illustration of a system 100 for provable backup confirmation of a private key for a digital wallet using key shards, according to one or more embodiments. The system 100 can include a compute devices 101, 111, 121, 131, a public platform 140, a wallet 116, and/or a network 130. The compute devices 101, 111, 121, 131 and/or the public platform 140 can communicate with each other via the network 130. The wallet 116 (also referred to herein as "digital wallet") can be owned by one of the compute devices 111, 121, 131, such as for example, compute device 111. In some implementations, the wallet 116 can be or include an electronic device such as, for example, an electronic wallet (e-wallet). In some cases, the wallet 116 can also be (or include) an online service and/or software program that allows one part, such as a wallet owner, to make electronic transactions with another party.

The compute device 101 includes a processor 102 and a memory 103 that communicate with each other, and with other components, via a bus 104. The bus 104 can include any of several types of bus structures including, but not limited to, a memory bus, a memory controller, a peripheral bus, a local bus, and any combinations thereof, using any of a variety of bus architectures. The compute device 101 can be or include, for example, a computer workstation, a terminal computer, a server computer, a handheld device (e.g., a tablet computer, a smartphone, etc.), and/or any machine capable of executing a sequence of instructions that specify an action to be taken by that machine. The compute device 101 can also include multiple compute devices that can be used to implement a specially configured set of instructions for causing one or more of the compute devices to perform any one or more of the aspects and/or methodologies described herein.

In some implementations, the compute device 101 can include a network interface 106. The network interface 106 can be used for connecting the compute device 101 to one or more of a variety of networks and one or more remote devices (e.g., compute device 111, 121, 131, public platform 140, etc.) connected thereto. In other words, the various devices including computer device 101, 111, 121, 131, and the public platform 140 can communicate with other devices via the network 130. In some implementations, the network 130 include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 130 can be a wireless network such as, for example, a Wi-Fi® or wireless local area network ("WLAN"), a wireless wide area network ("WWAN"), and/or a cellular network. In other instances, the network 130 can be a wired network such as, for example, an Ethernet network, a digital subscription line ("DSL") network, a broadband network, and/or a fiber-optic network. In some instances, the compute device 101 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 130 can be encrypted or unencrypted. In some instances, the network can include multiple networks or subnetworks operatively coupled to one another by, for example, network bridges, routers, switches, gateways and/or the like The processor 102 can be or include, for example, a hardware-based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The memory 103 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 102 to perform one or more processes, functions, and/or the like. In some implementations, the memory 103 can include extendable storage units that can be added and used incrementally. In some implementations, the memory 103 can be a portable memory (e.g., a flash drive, a portable hard disk, and/or the like) that can be operatively coupled to the processor 102. In some instances, the memory 103 can be remotely operatively coupled with a compute device (not shown); for example, a remote database device can serve as a memory and be operatively coupled to the compute device. The memory 103 can include various components (e.g., machine-readable media) including, but not limited to, a random-access memory component, a read only component, and any combinations thereof. In one example, a basic input/output system (BIOS), including basic routines that help to transfer information between components within the compute device 101, such as during start-up, can be stored in memory 103. The memory 103 can further include any number of program modules including, for example, an operating system, one or more application programs, other program modules, program data, and any combinations thereof.

In some implementations, the compute device 101 can be, for example, a custodian. For instance, the compute device 101 can be a trusted entity responsible for generating and distributing key shards of secrets to parties involved in a secret sharing scheme, to prove backup of the secrets for the wallet 116 owned by the compute device 111. In some cases, the compute device 101 does not own its own key shard of a secret. In some cases, the compute device 101 can own a shard of the secret. In some implementations, the compute device 101 can also be responsible for generating key shards and dividing key shards into new key shards, as well as distributing the new key shards to parties (e.g., compute device 111, 121, 131) involved in the secret sharing scheme or to new parties (not shown in FIG. 1). In some implementations, the compute device 101 can also be a verifier that is responsible for verifying the identity of the parties involved in the secret sharing scheme and ensuring that any key shards owned by each party is valid and/or securely distributed. In some implementations, the secret can be or include a private key for the wallet 116 and the shards from the secret (private key) can be key shards.

Each of the compute device 111, 121, 131 can be structurally similar to compute device 101. For instance, compute devices 111, 121, 131 can participate in a secret sharing scheme to prove knowledge of key shards and/or reconstruct a private key for the wallet 116. In some cases, new compute devices (not shown in FIG. 1) that also can be selected to participate in the secret sharing. Compute device 111 can be a participant of at least a quorum of compute devices to perform a secret sharing scheme (e.g., Shamir's secret sharing scheme). The compute device 111 can also be an owner of the wallet 116. The wallet 116 can be or include a digital wallet such as, for example, a hierarchical deterministic (HD) wallet.

The compute device 111 can have possession of a public key 115 associated with the wallet 116. In some implementations, the public key 115 can also be or include an encryption witness for the private key of the wallet 116. This is so, at least in part, such that the encryption witness (e.g., public key 115) can be used to verify proofs of knowledge of shards that can be used to reconstruct the private key of the wallet 116. In some implementations, the public key 115 can part of an asymmetric key pair. In some cases, a private key of that asymmetric key pair may be lost such that the private key requires reconstruction to access the wallet 116. The private key of that asymmetric key pair can include, for example, the private key for the wallet 116 and/or the private key to access assets in the wallet 116. In some implementations, the private key of the wallet 116 can be reconstructed, to produce a reconstructed private key 113, using a number of key shards of that private key that was previously divided into. In some implementations, the reconstructed private key 113 can be provided to the wallet 116 owner (e.g., compute device 111). In some cases, the reconstructed private key 113 can replace an original private key of the wallet 116 and/or be correlated to the public key 115 of the wallet 116. The private key of the wallet 116 can also be referred to herein as a "secret." The reconstructed private key 113 can be generated using multiple key shards from at least the quorum of compute devices. In other words, compute device 121 and compute device 131 can use their key shards in the generation of the reconstructed private key 113.

For example, the wallet 116 owner and the compute device 111, can share the secret such that the compute device 101 (or the compute device 111 that owns the wallet 116), can generate a random polynomial based on at least a quorum of compute devices selected to generate key shards (e.g., Shamir's secret sharing scheme). For instance, the random polynomial of degree n−1 can be generated where n can be the number of key shards used to reconstruct the private key of the wallet 116 and/or generate the reconstructed private key 113. In some cases, the random polynomial can include a constant term that can be set to a private key of the wallet 116 (or a value of the private key of the wallet 116) and a set of coefficients that can be randomly selected. The key shards can be generated based on various points on a curve (e.g., finite field, Galois field, etc.) associated with the random polynomial. In other words, each key shard can be generated based on a different point on the curve.

In some implementations, the secret (e.g., private key of the wallet 116) can include a secret value such, for example, a password, cryptographic key, and/or any other sensitive information. The compute device 101 can divide the secret and/or secret value to generate key shards to be distributed to each compute device from at least the quorum of compute devices (e.g., compute device 121, 131). In some cases, the compute device 101 can distribute more than one key shard to each compute device from at least the quorum of compute devices. This is so, at least in part, such that no single compute device (e.g., compute device 121, 131), or less than a quorum, can reconstruct the secret and/or secret value independently. Additionally a minimum number of participants (based on a threshold number) can be required such that each participant can combine their key shards to reconstruct the secret and/or generate the reconstructed private key 113.

The compute device 121 can include a key shard 122, an encrypted key shard 123, a private key 124, a public key 126, and a proof 127. In some implementations, the private key 124 and the public key 126 can be part of an asymmetric key pair of the compute device 121. In some implementations, the compute device 101 can generate the key shard 122 from the private key of the wallet 116 via any shard generating protocol as described herein and send the key shard 122 to the compute device 121. In some cases, the compute device 121 can generate its own key shard 122 from the private key of the wallet 116. The key shard 122, combined with other key shards (based on a minimum number of key shards and/or participants required for reconstruction), can generate the reconstructed private key 113. The key shard 122 can be encrypted using an encryption key (not shown) associated with the compute device 121 to generate the encrypted key shard 123. The encrypted key shard 123, combined with other encrypted key shards (based on a minimum number of key shards and/or participants required for reconstruction), can be used to reconstruct an encryption of the private key of the wallet 116 (also referred to herein as "encrypted private key"). The compute device 121 can generate the proof 127 that is configured to prove knowledge of the key shard 122 and/or encrypted key shard 123, without revealing private information about the key shard 122, the owner of the key shard 122, the private key of the wallet 116, and/or the owner of the private key of the wallet 116. The proof 127 can be or include any cryptographic proof as described herein such as, for example a zero-knowledge proof (ZKP). In some implementations, the compute device 121 can transmit the proof 127 to the public platform 140. In some cases, the public platform 140 can include a blockchain such that the compute device 121 can tokenize the proof 127 (e.g., ZK) to be recorded on the blockchain. In some implementations, the compute device 101 can receive the proof 127, generate a token based on the proof 127, and record it on the blockchain.

The compute device 131 can include a key shard 132, an encrypted key shard 133, private key 134, a public key 136, and a proof 137. In some implementations, the private key 134 and the public key 136 can be part of an asymmetric key pair of the compute device 131. In some implementations, the compute device 101 can generate the key shard 132 from the private key of the wallet 116 via any shard generating protocol as described herein and send the key shard 132 to the compute device 131. In some cases, the compute device 131 can generate its own key shard 132 from the private key of the wallet 116. The key shard 132, combined with other shards (based on a minimum number of key shards and/or participants required for reconstruction), can be used to generate the reconstructed private key 113. The key shard 132 can be encrypted using an encryption key associated with the compute device 131 to generate the encrypted key shard 133, without revealing private information about the key shard 132, the owner of the key shard 132, the private key of the wallet 116, and/or the owner of the private key of the wallet 116. The encrypted key shard 133, combined with other encrypted key shards (based on a minimum number of shards and/or participants required for reconstruction), can reconstruct an encryption of the private key of the wallet 116 (also referred to herein as "encrypted private key"). The compute device 131 can generate the proof 137 that is configured to prove knowledge of the key shard 132 and/or encrypted key shard 133. The proof 137 can be or include any cryptographic proof as described herein such as, for example a zero-knowledge proof (ZKP). In some implementations, the compute device 131 can transmit the proof 137 to the public platform 140. In some cases, the public platform 140 can include a blockchain such that the compute device 131 can tokenize the proof 137 (e.g., ZK) to be recorded on the blockchain. In some implementations, the compute device 101 can receive the proof 137, generate a token based on the proof 127, and record it on the blockchain.

The public platform 140 can be, for example, an electronic device, such as a compute device or server, that hosts a public platform. In some cases, the public platform 140 can be (or provide) a digital space or environment publicly accessible and/or includes a tool(s)/service(s) enabling users and organizations to communicate, collaborate, and/or share information. In some implementations, the public platform 140 can be or include a public forum. In some implementations, the public platform 140 can be a distributed ledger such as, for example, a blockchain that is maintained by a distributed ledger network (DLN). The distributed ledger network is described further below with respect to FIG. 3. The distributed ledger can be or include a ZKP-enabled DLN. In some implementations, proofs such as ZKPs provided by shardholders (e.g., compute device 121, 131) can be used to prove that shardholders are able to reproduce key shards (e.g., key shard 122, 132) (or backup key shards), similarly, to reproduce the secret (e.g., private key for the wallet 116). In some cases, shardholders can be required to demonstrate the ability to reproduce periodically for consistency. For instance, the compute device 121 can produce the proof 127 (e.g., ZKP), which can be used to demonstrate knowledge of the key shard 122 (or encrypted key shard 123), without revealing information about the key shard 122 (or encrypted key shard 123), such as, for example, identity of the owner of the key shard 122 (or encrypted key shard 123), value of the key shard 122 (or encrypted key shard 123), the owner of the key shard 122 (or encrypted key shard 123) the private key of the wallet 123, the owner of the private key of the wallet 116, and/or the like.

For instance, the proof 127 can be generated remote and/or separate from the public platform 140. In some implementations, the compute device 121 can publish the proof 127 on the public platform 140 that includes a reference to the key shard 122 and the proof 127. In other words, what is published in the public platform 140 is not necessarily the key shard 122 and/or the proof 127 themselves, but a reference to the key shard 122 and/or proof 127. In some implementations, the proof 127 (e.g., ZKP) can be used as evidence that the proof 127 had been previously satisfied, thereby verifying that the compute device 121 had possession of knowledge of the key shard 122. In other words, for the proof 127 to have been published at some time earlier, the proof 127 was verified. The compute device 101 can use the published proof 127 (e.g., ZKP) as evidence and confirm that the compute device 121 has knowledge of the key shard 122. In some implementations, the compute device 101 can receive the proof 127 and verify the proof 127 to generate a proof verification(s) 117. In some implementations, the proof 127 can also include a reference to the public key 115 of the wallet 116.

In some implementations, the compute device 101 can verify the proof 127 by checking a timestamp of the published proof 127 on the public platform 140, thereby verifying that the compute device 121 has knowledge of the key shard 122. Alternatively or additionally, the compute device 101 can verify the proof 127, by identifying the proof 127 that was published on the public platform 140 and confirming that the reference in that proof 127 leads to the public key 115 of the wallet 116, thereby verifying that the compute device 121 has knowledge of the key shard 122. In the case that the public platform 140 is a blockchain, the compute device 101 can check a transaction block on the blockchain associated with the commitment by the compute device 121. The compute device 101 can verify, based on a timestamp of the transaction block to confirm that the key shard 122 was generated and/or committed to the blockchain at a certain point in time in the past to prove that the compute device 121 had knowledge of the key shard 122 at that time. In other words, the timestamp ensures when verification and/or testing of knowledge of key shard 122 (or any key shard) occurred. As such, the ZKP (or some proof of knowledge) can be made public.

In some implementations, the memory 103 of the compute device 101, which can act as a custodian and/or verifier, can include a proof verification(s) 117 and a digital attestation(s) 118. The proof verification(s) 117 received from at least the quorum of compute devices participating in the secret sharing scheme can indicate that those compute device can (or are enabled to) reconstruct the private key for the digital wallet 116. For instance, the compute device 101 can provide the proof verification(s) 117 back to the compute device 121 in response to verifying the proof 127 from the compute device 121. The compute device 101 can provide the proof verification(s) back to the compute device 131 in response to verifying the proof 137 from the compute device 131. The compute device 101 can generate a proof verification for each proof received from at least the quorum of compute devices.

In some implementations, the compute device 101 can also use the digital attestation(s) 118. Although ZKPs can be useful to obfuscate secrets to maintain secrecy of the public key 115 for the wallet 116, some ZKPs that the compute device 101 receives and/or are published (or referenced) on the public platform 140 can refer to a public key that is not the public key 115 for the wallet 116. The digital attestation(s) 118 can be used for example to attest to a linkage of the proofs (e.g., proof 127, 137) to the public key 115 of the wallet 116. In other words, a proof that demonstrates validity to a public key may not be related to the public key 115 of the digital wallet of interest; the digital attestation(s) 118 can solve that by pointing to the actual public key 115 for the wallet 116. In some implementations, the compute device 101 can receive the digital attestation(s) 118 from an attestation agent (not shown in FIG. 1). In some cases, the digital attestation(s) 118 can include a single digital attestation for all proofs received in a secret sharing to reconstruct the private key for the wallet 116. In some cases, the attestation agent can provide a digital attestation for each proof from at least the quorum of compute devices participating in the secret sharing. In some implementations, the digital attestation(s) 118 can indicate that a public key in a proof is directed to the public key 115 of the wallet 116 via publication of the digital attestation(s) 118 to the public platform 140. In some implementations, the digital attestation(s) 118 can be, for example, a digital signature generated via a public key (certification) of the attestation agent. For example, the digital attestation(s) 118 can include a digital signature of name of the owner of the wallet 116, context of the wallet (e.g., hot, cold wallet), timestamp, and/or the like.

In some implementations, the memory 103 of the compute device 101 can store instructions to cause the processor to receive, from each compute device that is from at least the quorum of compute devices (e.g., compute device 121, 131) (1) an encrypted key shard (e.g., encrypted key shard 123, 133) from a set of encrypted key shards associated with the private key of the wallet 116 and (2) a proof (e.g., proof 127, 137) from a set of proofs. In some implementations, the private key of the wallet 116 can be associated with the asymmetric key pair for the wallet 116. The proofs can be or include any cryptographic proof as described herein such as, for example, ZKPs. The encrypted key shard 123 from the compute device 121 can be generated from a key shard 122 from a set of key shards. The encrypted key shard 123 can be encrypted using an encryption key from an asymmetric key pair associated with the compute device 121. The encrypted key shard 133 from the compute device 131 can be generated from a key shard 132 from the set of key shards. The encrypted key shard 133 can be encrypted using an encryption key from an asymmetric key pair associated with the compute device 131. The proof 127 can indicate that the compute device 121 can decrypt the encrypted key shard 123 using a decryption key from the asymmetric key pair associated with the compute device 121 and without revealing a value of the private key (or the private key) for the wallet 116. The proof 137 can indicate that the compute device 131 can decrypt the encrypted key shard 133 using a decryption key from the asymmetric key pair associated with the compute device 131 and without revealing the value of the private key (or the private key) for the wallet 116. In some implementations, the compute device 101 can receive multiple proofs from multiple compute devices from any quorum of compute devices.

In some implementations, the memory 103 can store instructions to further cause the processor 102 to generate, for each compute device (e.g., compute device 121, 131) from at least the quorum of compute devices, a proof verification (e.g., proof verification(s) 117) from a set of proof verifications based on the encrypted key shard (e.g., encrypted key shard 123, 133) for that compute device (e.g., compute device 121, 131) and the public key 115 (e.g., encryption witness for the private key of the wallet 116) for the wallet 116. The proof verification(s) 117 can be or include any cryptographic proof verification(s) as described herein. In some implementations, the compute device 101 can be configured to generate proof verification(s) 117 for any number of proofs in parallel. In some implementations, the proof verification(s) 117 can indicate that the set of key shards (e.g., key shard 122, 132) decrypted from the set of encrypted key shards (e.g., key shard 123, 133) can be combined to reconstruct the private key for the digital wallet 116 (e.g., reconstructed private key 113).

For instance, the original private key for the wallet 116 may be lost or compromised, such that a reconstruction of the original private key is desired. The key shards (e.g., key shard 122, 132) can be previously distributed to multiple compute devices such that as long as a minimum number of compute devices holding key shards are not compromised, those compute devices can reconstruct the original private key with their key shards. In the case that one or more compute devices that owned a key shard is compromised, lost, and/or leaves a collective system, new key shards, generated from individual key shards, can be generated to further prevent single point of attack. As multiple shard-holders hold, in part, a piece to the original private key, each shardholder can participate in a secret sharing scheme facilitated by the compute device 101 to verify knowledge of each key shard, thereby proving backup of each key shard and the original private key. The participating shardholders can be selected from a group of shardholders. For instance, shardholders can be randomly selected to participate in the secrets sharing scheme.

In some implementations, the proof verification(s) 117 can also indicate that at least a quorum of encrypted key shards from the set of encrypted key shards (e.g., encrypted key shards 133) can be combined to generate an encrypted private key (not shown in FIG. 1) for the wallet 116 without decryption of the encrypted key shards (e.g., encrypted key shards 123, 133). Note at least the quorum of compute devices can include more compute devices than those shown in FIG. 1.

In some implementations, the proof verification(s) 117 can also indicate validity of the public key 126 of the compute device 121 and indicate validity of the public key 136 of the compute device 131. In some cases, the public key 126 can be associated with an asymmetric key pair for the compute device 121. In some cases, the public key 136 can be associated with an asymmetric key pair for the compute device 131. In some implementations, the memory 103 can store instructions to cause the processor 102 to generate, for one or more compute devices from at least the quorum of compute devices, the digital attestation(s) 118 from a set of digital attestations based on the proof verification(s) 117 for the one or more compute device and that indicates a reference to the public key 115 for the digital wallet. In some implementations, the digital attestation(s) 118 can be generated by an attestation agent (not shown in FIG. 1) and provided to the compute device 101. The memory 103 can also store instructions to further cause the processor 102 to transmit the digital attestation(s) 118 to the public platform 140. For instance, in the case that the owner of the wallet 116 (e.g., compute device 111) also owns a key shard of the wallet 116 and generates a proof for that key shard, the digital attestation(s) 118, which can be associated with the compute device 111 can prove that the public key from the proof provided by the compute device 111 is the public key 115 for the wallet 116.

In some implementations, for each compute device (e.g., compute device 121, 131) from at least the quorum of compute devices, the digital attestation(s) 118 can include a digital signature of the public key (e.g., public key 126, 136) for that compute device and can be generated based on the private key (e.g., private key 124, 134) for that compute device (e.g., compute device 121, 131). In other words, the digital signature can also be signed using a shardholder's private key, to generate the digital signature for the digital attestation. In some cases, the private key 124 can be associated with the asymmetric key pair for the compute device 121 such that the asymmetric key pair for the compute device 121 includes the private key 124 and the public key 126. In some cases, the private key 134 can be associated with the asymmetric key pair for the compute device 131 such that the asymmetric key pair for the compute device 131 includes the private key 134 and the public key 136.

In some implementations, a quorum of compute devices is at least a first quorum of compute devices. In other words, at least the first quorum of compute devices includes compute device 121 and compute device 131. The memory 103 can store instructions to further cause the processor 102 to divide encrypted key shards (e.g., encrypted key shard 123, 133) from at least the first quorum of compute devices. For example, the processor 102 can divide the encrypted key shard 123 into a new set of encrypted key shards from multiple new sets of encrypted key shards. The processor 102 can also divide the encrypted key shard 133 into a new set of encrypted key shards from multiple new sets of encrypted key shards. The multiple new sets of encrypted key shards can still be associated with the private key for the wallet 116 and each new set of encrypted key shards from the plurality of new sets of encrypted key shards can be periodically distributed. For instance, prior to future division of each new encrypted key shard, the memory 103 can store instructions to further cause the processor 102 to periodically distribute each new encrypted key shard (1) among at least the first quorum of compute devices (e.g., compute device 121, 131), (2) to at least a second quorum of compute devices from a set of compute devices that is different from at least the first quorum of compute devices (e.g., compute device 121, 131), or (3) to at least a third quorum of compute devices from the set of compute devices and that includes one or more compute devices from each of the at least the first quorum of compute devices and the at least the second quorum of compute devices. Each compute device receiving the new encrypted key shard(s) can store that new encrypted key shard(s) in its own memory. In some cases, the division and distribution of new encrypted shards can be referred to as "resharding." In other words, the new encrypted key shards from the resharding can be combined to reconstruct the encrypted private key for the wallet 116, which can be an encryption of the private key for the wallet 116. The encrypted private key can be decrypted to obtain the private key for the wallet 116.

In some implementations, the memory 103 can store instructions to further cause the processor 102 to set a predetermined count of compute devices to be part of at least the quorum of compute devices. For example, compute device 121, compute device 111, and/or compute device 131 can be the compute devices selected from the set of compute devices (e.g., a larger set of compute devices) to participate in the reconstruction of the private key for the wallet 116. The memory 103 can store instructions to cause the processor 102 to select each compute device from one or more quorums of compute devices to participate in the reconstruction.

In some implementations, the encrypted key shard from the set of encrypted key shards (e.g., encrypted key shard 123, 133) for each compute device from at least the quorum of compute devices (e.g., compute device 121, 131) can be included in a data element from a set of data elements recorded on the public platform 140. In other words, the data elements can be a transaction block that is committed to the public platform 140 such as, for example, a blockchain. In some implementations, for each compute device from at least the quorum of compute devices (e.g., compute device 121, 131), the proof (e.g., proof 127, 137) can include a hash value from a set of hash values computed based on a hash of the data associated with the compute device for that proof (e.g., 127, 137). For example, the proof 127 from the compute device 121 can include a hash value computed based on a hash of the data including the encrypted key shard 123 of the compute device 121. In another example, the proof 137 from the compute device 131 can include a hash value computed based on a hash of the data including the encrypted key shard 133 of the compute device 131. In some implementations, the data can also include a timestamp indicating that the proof (e.g., proof 127, 137) is generated after the encrypted key shard (e.g., encrypted key shard 123, 133) for that compute device (e.g., compute device 121, 131) was recorded on the public platform 140, a witness from the compute device (e.g., compute device 121, 131) (which in some implementations can be a public key such as the public key 115 of the wallet 116), and/or a random value selected by the compute device 101. In other words, the compute device 101 can use the random value as a "challenge" for the compute device 121, 131 to correctly respond to in convince the compute device 101 validity of their proofs 127, 137. In other words, the encrypted key shard can be committed to the public platform 140 at some point in time before the proof is generated and/or verified, thereby proving that the compute device that owns that encrypted key shard has knowledge of that encrypted key shard. The memory 103 can store instructions to further cause the processor 102 to generate, for each compute device from at least the quorum of compute devices (e.g., compute device 121, 131), the proof verification(s) 117 based on the proof (e.g., proof 127, 137) and the hash value for that compute device (e.g., compute device 121, 131, respectively), which can further confirm that the proof for that compute device is generated after the data element associated with the encrypted key shard for that compute device was recorded the public platform 140. In other words, a shardholder can generate a random value (e.g., hash value) via a hash function and using the key shard of the shardholder and additional inputs (e.g., random seed/nonce, etc.). This is so, at least in part, for the shardholder to use the hash value as a commitment to the shard and generate a ZKP to prove knowledge of the key shard corresponding to the commitment, without revealing any information about the key shard.

For instance, a block on a blockchain can have some value B. That block can be viewed by any entity, and those entities can know exactly the order in which that block was generated based on a timestamp that the block was committed. The proofs (e.g., proof 127, 137), which can include non-interactive ZKPs, can include a hash of values representing various information, including B. As such, the hash is generated after the block containing B was created and committed, and not before.

In some implementations, to reconstruct the private key for the wallet 116 and/or generate the reconstructed private key 113 for the wallet 116, the processor 102 can be caused to set a predetermined threshold of key shards. The processor 102 of the compute device 101 can then transfer the reconstructed private key 113 to the compute device 111 (e.g., owner of the wallet 116) such that the compute device 111 can use the reconstructed private key 113 to access assets in the wallet 116. In other words, the reconstruction of the private key of the wallet 116 can be performed by and/or at any compute device (or any compute device not including the wallet 116 owner). For instance, not every key shard divided from the private key for the wallet 116 is necessary to generate the reconstructed private key 113. As such, the processor 102 can set, depending on quality of accuracy, the predetermined threshold of number of key shards. In other words, the processor 102 can dictate some required amount of shards from each shardholder in at least the quorum of compute devices to participate in a secrets sharing scheme to generate the reconstructed private key 113, thereby proving backup of the private key for the wallet 116 and/or the key shards that the shardholder owns. The memory 103 can store instructions to further cause the processor 102 to request individual compute device from the set of compute devices to be included in at least the quorum of compute devices to participate in secret sharing for reconstruction of a private key based on the predetermined threshold of key shards. In some cases, the selected compute devices can be, for example, compute device 121 and compute device 131. Each compute device from the set of compute devices can possess at least one encrypted key shard from the set of encrypted key shards (e.g., encrypted key shard 123, 133).

In some implementations, the memory 103 can store instructions to further cause the processor to transmit a notification including the proof verification(s) 117 to at least the quorum of compute devices. For instance, the compute device 101 can transmit the proof verification(s) 117 to the compute device 121 in response to a verification of the proof 127 and transmit the proof verification(s) 117 to the compute device 131 in response to a verification of the proof 137. In response to validation of the proofs 127, 137, each compute device can use their key shard 122, 132 to enable reconstruction of the private key for the wallet 116 and/or generate the reconstructed private key 113. In other words, the shardholders can use their key shards to reconstruct a secret without maintaining the secret for themselves. The reconstructed secret is provided to the owner of the original secret. The memory 103 can store instructions to cause the processor 102 to receive the reconstructed private key 113 and verify that the reconstructed private key 113 is associated with the public key 115 of the wallet 116. In some cases, the processor 102 can verify by attempting to unlock the wallet 116 using the reconstructed private key 113. Once verified, the reconstructed private key 113 can be given to the owner of the wallet 116 and/or the original private key (e.g., compute device 111).

Figure 2:
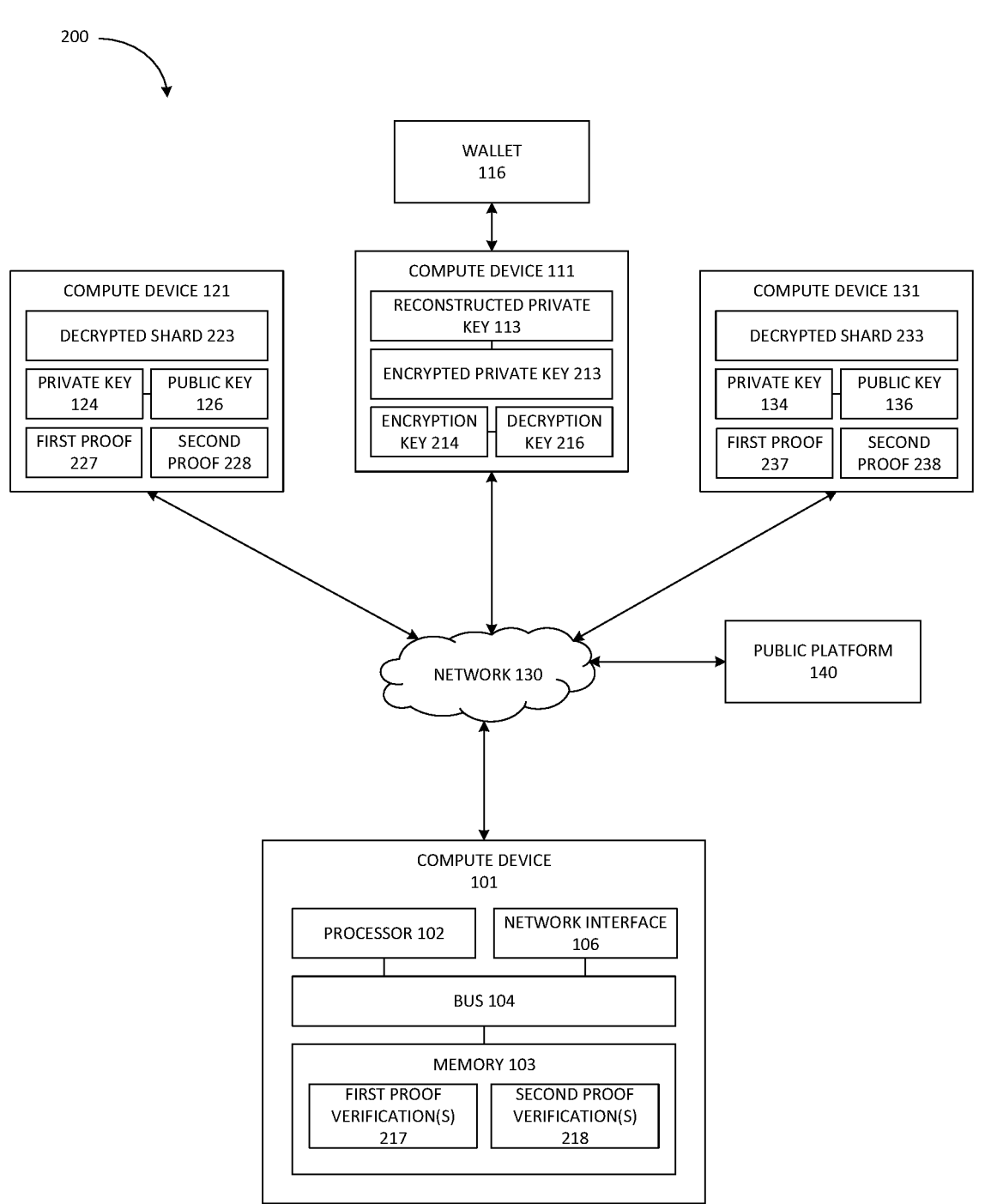
FIG. 2 is a diagrammatic illustration of a system for provable backup confirmation of a decryption key for an encrypted private key for a digital wallet using key shards, according to one or more embodiments.

FIG. 2 is a diagrammatic illustration of a system 200 for provable backup confirmation of a decryption key for an encrypted private key for a digital wallet using key shards, according to one or more embodiments. The system 200 can be structurally similar to the system 100 in FIG. 1. The system 200 can include compute devices 101, 111, 121, 131, a public platform 140, a wallet 116, and/or a network 130. The compute devices 101, 111, 121, 131 and/or the public platform 140 can communicate with each other via the network 130. The wallet 116 can be owned by one of the compute devices 111, 121, 131, such as for example, compute device 111.

In some implementations, the compute device 121 can include a key shard 122, encrypted key shard 123, private key 124, a public key 126, and a first proof 227, and a second proof 228. The private key 124 and the public key 126 can be part of an asymmetric key pair of the compute device 121. The key shard 122 can be produced from the private key of the wallet 116 via any shard generating protocol as described herein. The key shard 122, combined with other key shards (based on a minimum number of key shards and/or participants required for reconstruction), can generate the reconstructed private key 113. The key shard 122 can be encrypted using an encryption key associated with the compute device 121 to generate the encrypted key shard 123. The encrypted key shard 123, combined with other encrypted key shards (based on a minimum number of key shards and/or participants required for reconstruction), can reconstruct an encryption of the private key of the wallet 116 (also referred to herein as "encrypted private key"). The compute device 121 can generate the first proof 227 that is configured to prove knowledge of the key shard 122 and/or encrypted key shard 123. The first proof 227 can be or include any proof of knowledge as described herein such as, for example a zero-knowledge proof (ZKP). In some implementations, the compute device 121 can make a commitment of the first proof 227 to the public platform 140. In some implementations, the compute device 101 can receive the first proof 227 and commit the first proof 227 to the public platform 140. In some implementations, the compute device 121 can generate the second proof 228 that indicates that the decrypted key shards 223 can be used to reconstruct the decryption key 216 for the wallet 116.

The compute device 131 can include a s key hard 132, encrypted key shard 133, private key 134, a public key 136, a first proof 237, and a second proof 238. The private key 134 and the public key 136 can be part of an asymmetric key pair of the compute device 131. The key shard 132 can be produced from the private key of the wallet 116 via any key shard generating protocol as described herein. The key shard 132, combined with other key shards (based on a minimum number of key shards and/or participants required for reconstruction), can generate the reconstructed private key 113. The key shard 132 can be encrypted using an encryption key associated with the compute device 131 to generate the encrypted key shard 133. The encrypted key shard 133, combined with other encrypted key shards (based on a minimum number of key shards and/or participants required for reconstruction), can reconstruct an encryption of the private key of the wallet 116 (also referred to herein as "encrypted private key"). The compute device 131 can generate the proof 237 that is configured to prove knowledge of the key shard 132 and/or encrypted key shard 133. The first proof 237 can be or include any proof of knowledge as described herein such as, for example a zero-knowledge proof (ZKP). In some implementations, the compute device 131 can make a commitment of the first proof 237 to the public platform 140. In some implementations, the compute device 101 can receive the first proof 237 and commit the proof 237 to the public platform 140. In some implementations, the compute device 131 can commit the first proof 237 to the public platform 140. In some implementations, the compute device 131 can generate the second proof 238 that indicates that the decrypted key shard 233 can be used to reconstruct the decryption key 216 for the wallet 116.

The compute device 111 can have possession of the private key for the wallet 116. In some cases, the compute device 111 may have lost the private key for the wallet 116, such that the compute device 111 is given the reconstructed private key 113. In some implementations, the compute device 111 can possess an encryption of the private key for the wallet 116. For instance, the private key (which may have been lost and requires reconstruction) can be encrypted (or decrypted) using an encryption key 214 to generate an encrypted private key 213. In some implementations, the private key can be associated with an asymmetric key pair. The encrypted private key 213 can be decrypted using a decryption key 216 of the asymmetric key pair including the encryption key 214. In some cases, the encryption key 214 and the decryption key 216 can be the same.

In some implementations, the memory 103 of the compute device 101 can store instructions to cause the processor 102 to receive, from each compute device from at least a quorum of compute devices (e.g. compute device 121, 131, and/or 111), (1) an encrypted key shard from a set of encrypted key shards (not shown in FIG. 2) associated with the encrypted private key 213 of a first asymmetric key pair of a wallet 116 and (2) a proof from a set of proofs (e.g., proofs 227, 237). The proof 227 can indicate that the compute device 121 can decrypt the encrypted key shard held by the compute device 121. The decryption of the encrypted key shard of the compute device 121 can be a decrypted shard 223. The decrypted key shard 223 can also be referred to as just a "shard." The proof 237 can indicate that the compute device 131 can decrypt the encrypted key shard held by the compute device 131. The decryption of the encrypted key shard of the compute device 131 can be a decrypted key shard 233.

The memory 103 can store instructions to further cause the processor 102 to generate, for each compute device from at least the quorum of compute device, a first proof verification from a set of first proof verification(s) 217 based on the encrypted key shard for that compute device and a public key (not shown in FIG. 2) of the first asymmetric key pair for the wallet. The first proof verification(s) 217 can indicate that the set of encrypted key shards can be combined to reconstruct the encrypted private key 213 for the wallet without decryption of the set of encrypted key shards. In some implementations, the encrypted private key 213 can be generated from a private key of the first asymmetric key pair for the wallet 116 using the encryption key 214 from a second asymmetric key pair for the wallet 116. In other words, the encrypted key shards can be combined to generate the encrypted private key 213, which is an encryption of the private key for the wallet 116.

In some implementations, the memory 103 can store instructions to further cause the processor 102 to generate, for each compute device from at least the quorum of compute devices (e.g., compute device 121, 131, and/or 111), a decrypted key shard from a set of decrypted key shards (e.g., decrypted key shard 223, 233) from a decryption key 216 from the second asymmetric key pair for the wallet 116. The set of decrypted key shards (e.g., decrypted key shard 223, 233) can be periodically distributed (or rotate ownership) among at least the quorum of compute devices (e.g., compute device 121, 131, and/or 111). In other words, the decryption key 216 can be divided into multiple decrypted key shards (or key shards) for added security.

In some implementations, the memory 103 can store instructions to cause the processor 102 to receive, from each compute device from at least the quorum of compute devices (e.g., compute device 121, 131, and/or 111), a second proof from a set of second proofs (e.g., second proof 228, 238) indicating that the set of decrypted key shards (e.g., 223, 233) can reconstruct the decryption key 216 for the wallet 116.

In some implementations, the memory 103 can store instructions to further cause the processor 102 to generate, for each compute device from at least the quorum of compute devices (e.g., compute device 121, 131, and/or 11), a second proof verification from a set of second proof verification(s) 218 based on the second proof for that compute device and indicating that the encrypted private key 213 for the wallet 116 can be decrypted using the decryption key 216 that was reconstructed using the set of decrypted key shards (e.g., decrypted shar 223, 233). In other words, after proving that the decrypted key shards of the decryption key 216 can regenerate the decryption key 216, the second proof verification(s) 218 can further validate that the reconstructed decryption key can unencrypt the encrypted private key 213, to be given to the compute device 111 (e.g., owner of the wallet 116).

In some implementations, let at least the quorum of compute devices is at least a first quorum of compute devices. The memory 103 can store instructions to further cause the processor 102 to periodically distributed the set of decrypted key shards (e.g., decrypted key shard 223, 233) to (1) at least a second quorum of compute devices from a set of compute devices that is different from at least the first quorum of compute devices or (2) to at least a third quorum of compute devices from the set of compute devices and that includes one or more compute devices from at least the first quorum of compute devices and at least the second quorum of compute devices. In other words, the decrypted key shards of the decryption key 216 can be divided and distributed (periodically) to a new quorum different from the original quorum, or to a new quorum that includes some new members and/or original members.

In some implementations, the memory 103 can store instructions to further cause the processor 102 to derive the private key for the wallet 116 to generate a set of child private keys. The set of child private keys can be distributed among each compute device from at least the quorum of compute devices (e.g., compute device 121, 131, and/or 111). The memory can store instructions to further cause the processor 102 to receive, from each compute device from at least the quorum of compute devices, a derivation path that is from a set of derivation paths that is used to derive the private key for the wallet 116 into the child private key for that compute device.

In some implementations, the derivation path of the wallet 116 can be a sequence of indices that can specify a series of child private keys that can be derived from a parent private key (e.g., private key of the wallet 116). The parent private key (also referred to herein as the private key) can be or include the root of the wallet 116, from which the series of child private keys can be derived using that derivation path. In some cases, the derivation path can be represented as a string of indices separated by slashes, where each index specifies a particular child key to derive. For example, the derivation path "m/0/1/2" specifies that the 2nd child key of the 1st child key of the 0th child key of the master key should be derived. In some implementations, to derive a child private key from a parent private key using a derivation path, the parent private key is hashed along with the index of the desired child private key. The hash value can be used to generate a new private key and corresponding public key, which can be used to generate a new address for the child private key. In some implementations, the process can be repeated recursively for each subsequent child private key in the derivation path, until the desired child private key is reached. The child private key can be derived without revealing information about the parent private key and/or information about any child private key(s) along the same derivation path. This is so, at least in part, to ensure privacy of the wallet 116 while enabling a user of the wallet 116 to easily manage a large number of private/public keys and addresses. Additionally, this allows for greater flexibility in managing multiple cryptocurrency accounts or addresses, while still maintaining a single master seed for backup and recovery purposes.

In some implementations, the memory 103 can store instructions to further cause the processor 102 to generate, for each compute device from at least the quorum of compute devices, a path proof from a set of path proofs based on the derivation path for that compute device (e.g., compute device 111) which indicates that a child public key is associated with the child private key derived from that derivation path. The path proof can be, for example, a cryptographic proof used to demonstrate that a child public key in the wallet 116, such as a hierarchical deterministic (HD) wallet, is associated with a child private key in a derivation path(s) of the wallet 116. In some implementations, the path proof can be generated via a Merkle tree that is configured to organize child private/public keys in a derivation path of the wallet 116. Each node in the Merkle tree can represent a hashed value of child nodes in the Merkle tree. The root node of the Merkle tree can represent a hash of all child private/public keys in all derivation paths of the wallet 116. In some implementations, the path proof can be generated based on a sequence of hashes that link a child private/public key to the root node of the Merkle tree. In some implementations, a child public key can be proven to be associated with a particular child private key in a derivation path based on a path proof that includes hashes of all of the parent nodes from that child private key to the root node of the Merkle tree. The path proof can then be provided along with the child public key as proof that the child private key associated with that child public key is valid and correctly derived from a master seed of the wallet 116.

Alternatively or additionally, the path proof can be generated by the wallet 116 itself, such that the path proof can be verified by the compute device 101 to confirm that the child public key is correctly associated with a specific child public key in the derivation path of the wallet 116, without revealing information about the wallet 116 and/or any of its child private/public keys.

Figure 3:
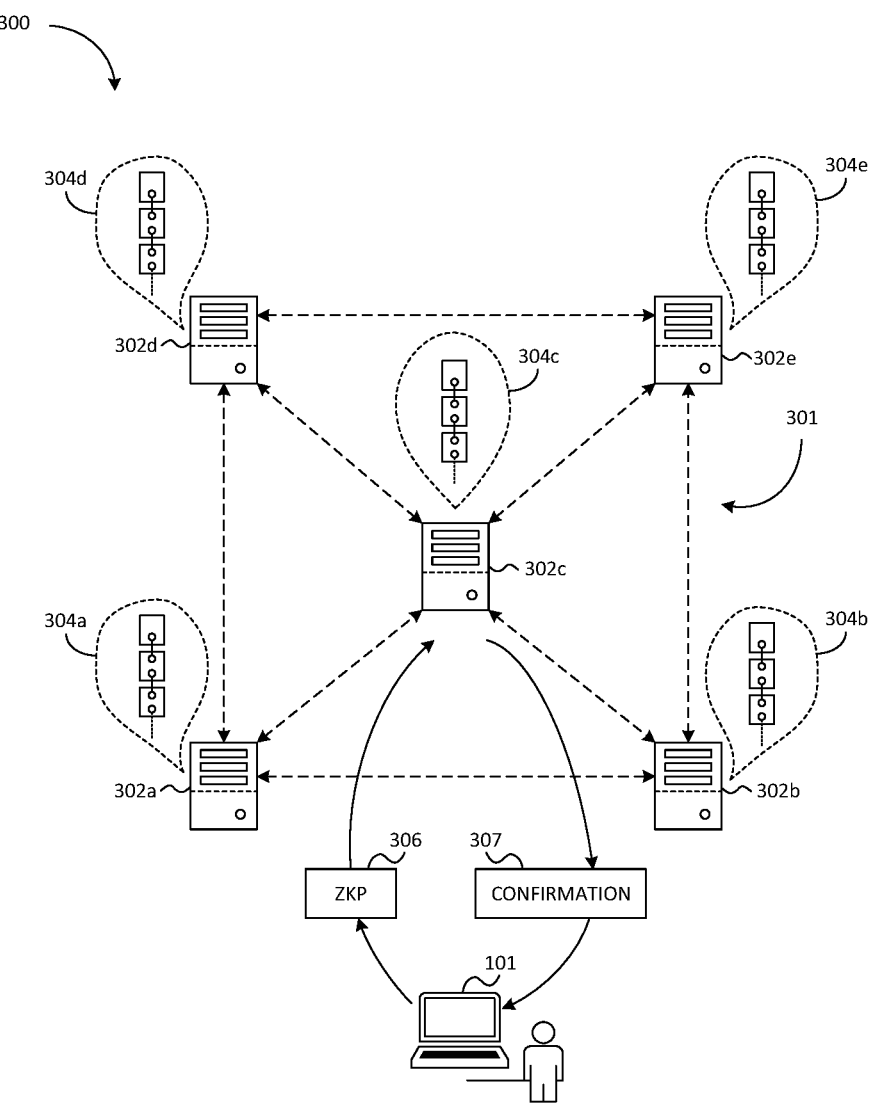
FIG. 3 is a diagrammatic illustration of system that includes a ZKP-enabled DLN for forming verifiably correct zero-knowledge proofs, according to an embodiment.

FIG. 3 is a diagrammatic illustration of system that includes a ZKP-enabled DLN for forming verifiably correct zero-knowledge proofs, according to an embodiment. In some implementations, the ZKP-enabled DLN 301 can be associated with the public platform 140 of FIG. 1 or FIG. 2. The ZKP-enabled DLN 301 can be, for example, a blockchain network and include multiple computing nodes 302a-202e. Each computing node can be configured to communicate amongst each other via a peer-to-peer (P2P) connection. In some implementations, the P2P connections can be provided by wired and/or wireless communications systems or networks (not shown) such as, for example, intranet, local area networks (LANs), wide area networks (WANs), etc., utilizing wireless communication protocols or standards such as WiFi®, LTER, WiMAX®, and/or the like.

In some embodiments, the ZKP-enabled DLN 301 can include (e.g., store) self-executing codes or smart contracts that are configured to execute upon validation and/or verification of ZKPs associated with verifications interacting on the ZKP-enabled DLN 301. For example, some or all of the computing nodes 302a-202e can include copies of a smart contract that self-executes upon validation and/or verification. In some implementations, the computing nodes 302a-202e can communicate amongst each other to arrive at a consensus for a ZKP 306. In some implementations, a computing node(s) 302a-202e can have a smart contract(s) that self-executes, and produces a result determining whether or not the ZKPs are correct and to be transmitted to the rest of the computing nodes 302a-202e for confirmation.

In some embodiments, the ZKP-enabled DLN 301 can be linked to one or more oracles (not shown in FIG. 3) or data feeds that provide external data to the ZKP-enabled DLN 301. For example, an oracle can be a hardware (e.g., computing node) or software (stored and/or executing on hardware) that is configured to gather or receive data from systems external to the ZKP-enabled DLN 301 and provide the collected data or information to a smart contract on the ZKP-enabled DLN 301. In some implementations, as discussed above, self-executing codes or smart contracts can automatically execute upon realization of conditions of correctness and/or existence of a reference to the ZKP 306, and the oracles may provide the data that can be used to evaluate whether the conditions are met. The smart contract, upon receiving the information, may self-execute after determining validation and/or verification of ZKP 306 has been fulfilled. In some embodiments, the oracles may facilitate for the smart contracts to send data out to external systems. For example, a smart contract can be configured to verify the ZKP 306 provided by a shareholder at a certain date and time, and send out the verification results and/or a confirmation 307 of execution/validation of the ZKP 306 back to the shardholder (or to a custodian such as compute device 101 of FIG. 1 or FIG. 2) when the verification is complete.

In some embodiments, at least a significant number of the computing nodes 302a-202e can include copies of a distributed ledger (e.g., the ZKP-enabled ledger 110 of FIG. 1) 304a-204e onto which ZKPs (including the ZKP 306) that occur on the network are recorded (e.g., stored, synchronized, updated). For instance, not all computing nodes will have the same and/or updated version of the distributed ledger 304a-204e. All of the computing nodes will eventually have the same and/or updated version of the distribute ledger 304a-204e in response to a consensus formed by a sufficient and/or majority number of computing nodes (e.g., consensus in confirming whether or not the ZKP 306 is correct). As such, all of the distributed ledgers 304a-204e are configured to be synched.

The recording of the ZKPs on the distributed ledger 304a-204e can occur when some significant number of the computing nodes 302a-202e, or a subset thereof, agree on the validity of the ZKPs. The distributed ledger 304a-204e can be immutable in response to a consensus being obtained from a significant number of computing nodes 302a-202e. In some implementations, the distributed ledger 304a-204e can be nearly immutable in the sense that to alter the distributed ledger 304a-204e, at least this significant number of the computing nodes 302a-202e would have to agree, which can be increasingly difficult when the number of computing nodes 302a-202e is large (and the distributed ledger 304a-204e gets longer).

Figure 4:
FIG. 4 is a schematic illustration of a block on a blockchain used to verify cryptographic proofs, according to one or more embodiments.
Figure 4:
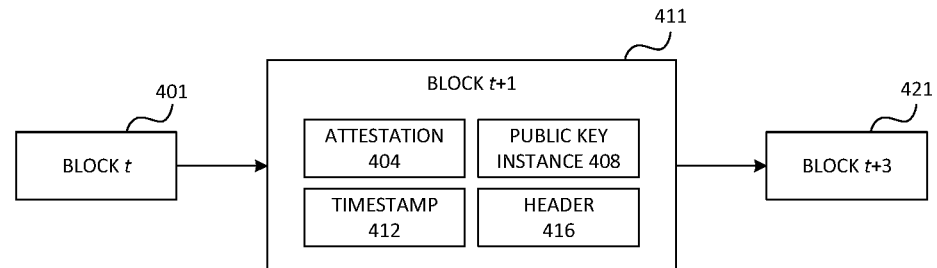

FIG. 4 is a schematic illustration of a block on a blockchain 400 used to verify cryptographic proofs, according to one or more embodiments. The blockchain 400 can be consistent with a distributed ledger and/or a ZKP-enabled DLN as described herein. The blockchain can include a block 401, a block 411, and a block 421. Block 401, block 411, and block 421 can be committed on the blockchain 400 in chronological order. In some implementations, the blocks 401, 411, 421 can represent a commitment of a ZKP and/or shard to verify that a shardholder has knowledge of the shard and/or a secret that the shard is derived from. In some implementations, the block 411 can include an attestation 404, a public key instance 408, a timestamp 412, and/or a header 416. The attestation 404 can be consistent with a digital attestation as described herein. The public key instance 408 can include a reference to an actual public key of a wallet. The timestamp 412 can include a time and/or date in which the block 411 was committed. The header 416 can be consistent with any blockchain header. It is important to note that each block in the blockchain can be structurally similar and include an attestation, a public key instance, a timestamp, and/or a header.

Figure 5:
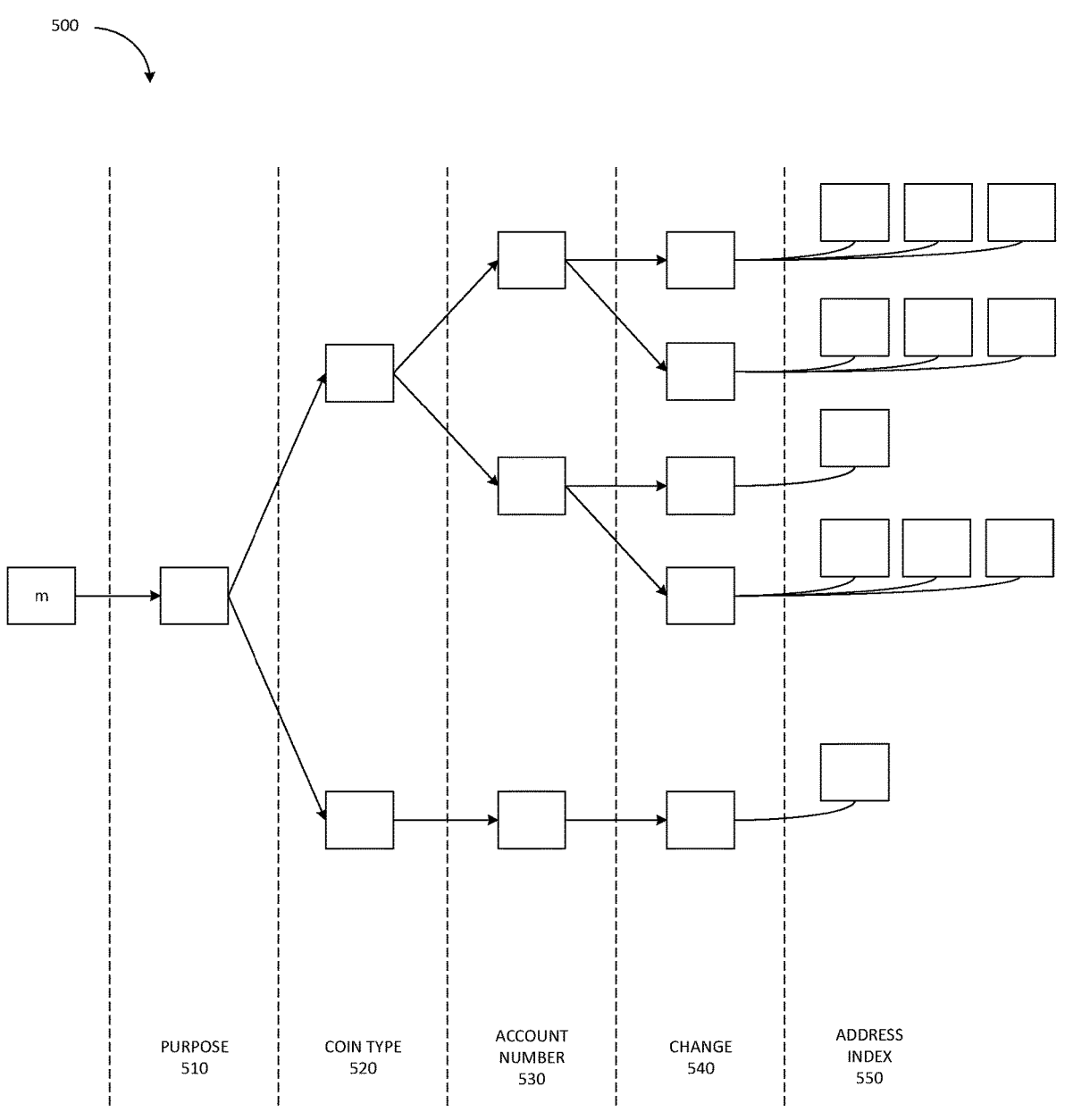
FIG. 5 is a schematic illustration of hierarchical deterministic digital wallet, according to one or more embodiments.

FIG. 5 is a schematic illustration of hierarchical deterministic (HD) digital wallet 500, according to one or more embodiments. The HD digital wallet 500 can be consistent with the wallet 116 of FIG. 1 or FIG. 2. Most digital wallets use a single wallet key to derive multiple wallet keys using some derivation protocol. For instance, a hash tree can be created by taking inputs at each level i, $publickey_i$, $chaincode_i$, and $index_i$, which can used in a hash function to return two values, $partial_{i+1}$ and $chaincode_{i+1}$. Subsequently, $publickey_{i+1} = partial_{i+1} \cdot G + publickey_i$. The $publickey_{i+1}$ and $chaincode_{i+1}$ can be used at the next level, if necessary, with $index_{i+1}$. A custodian (e.g., digital wallet owner) can prove that it has knowledge of the wallet key (e.g., $publickey_0$), chaincode ($chaincode_0$), and set of indexes (e.g., derivation path) can generate one or more of $publickey_j$ and chaincode; for any j without the need to reveal one or more of the wallet key ($publickey_0$) and chaincode ($chaincode_0$). In some implementations, any intermediate public key ($publickey_j$), chaincode ($chaincode_j$) and/or index ($index_j$) can remain secret. The derivation protocol can include, first, hashing each $publickey_0$, $chaincode_0$, and $index_0$. Next, for each level $1 \leq j \leq m$, where m is the highest level on the derivation path, the prover can hash the values $publickey_{j-1}$, $chaincode_{j-1}$, and $index_{j-1}$ in the required order and format using a derivation hash algorithm. The derivation hash algorithm can return randomized hashes of both $chaincode_j$ and $partial_j$. The derivation hash algorithm can also return the hash of $publickey_j = partial_j + publickey_{j-1}$. Using a Zero-Knowledge Succinct Non-interactive Argument of Knowledge (ZK-SNARK), the prover can prove the inputs for the derivation has algorithm are the values $publickey_{j-1}$, $chaincode_{j-1}$, and $index_{j-1}$ encoded in the prior round of randomized hashes resulting in randomized hashes of both $chaincode_j$ and $partial_j$. At the final round, the prover can publish the value of ($publickey_j$, $rand_{j,1}$) and/or ($chaincode_{j,2}$). The verifier can then confirm and/or validate all prior proofs and compute final output to check that Hash ($publickey_j$, $rand_{j,1}$) is equal to a prior output.

As shown in FIG. 5, purpose 510, coin type 520, account number 530, change 540, and address index 550 can represent derivation paths for the HD digital wallet 500. In some implementations, the HD digital wallet 500 can be a type of cryptocurrency wallet that uses a hierarchical structure to generate an unlimited number of private/public key pairs from a single master seed m. In some implementations, the derivation path of the HD digital wallet 500 can be a sequence of indices that can specific a series of child private keys that can be derived from a parent private key (e.g., private key of the HD digital wallet 500). The parent private key (also referred to herein as the private key) can be or include the root (where the master seed is located in FIG. 5) of the HD digital wallet 500, which the series of child private keys can be derived using that derivation path. In some cases, the derivation path can be represented as a string of indices separated by slashes, where each index specifies a particular child key to derive. For example, the derivation path "m/0/1/2" specifies that the 2nd child key of the 1st child key of the 0th child key of the master key should be derived. In some implementations, to derive a child private key from a parent private key using a derivation path, the parent private key is hashed along with the index of the desired child private key. The hash value can be used to generate a new private key and corresponding public key, which can be used to generate a new address for the child private key. In some implementations, the process can be repeated recursively for each subsequent child private key in the derivation path, until the desired child private key is reached. The child private key can be derived without revealing information about the parent private key and/or information about any child private key(s) along the same derivation path. This is so, at least in part, to ensure privacy of the HD digital wallet 500 while enabling a user of the HD digital wall 500 to easily manage a large number of private/public keys and addresses. Additionally, this allows for greater flexibility in managing multiple cryptocurrency accounts or addresses, while still maintaining a single master seed for backup and recovery purposes.

In some implementations, a path proof from a set of path proofs can be generated based on the derivation path which indicates that a child public key is associated with the child private key derived from that derivation path. The path proof can be, for example, a cryptographic proof used to demonstrate that a child public key in the HD digital wallet 500 is associated with a child private key in a derivation path(s) of the HD digital wallet 500. In some implementations, the path proof can be generated via a Merkle tree that is configured to organize child private/public keys in a derivation path of the HD digital wallet 500. Each node in the Merkle tree can represent a hashed value of child nodes in the Merkle tree. The root node of the Merkle tree can represent a hash of all child private/public keys in all derivation paths of the HD digital wallet 500. In some implementations, the path proof can be generated based on a sequence of hashes that link a child private/public key to the root node of the Merkle tree. In some implementations, a child public key can be proven to be associated with a particular child private key in a derivation path based on a path proof that includes hashes of all of the parent nodes from that child private key to the root node of the Merkle tree. The path proof can then be provided along with the child public key as proof that the child private key associated with that child public key is valid and correctly derived from a master seed of the HD digital wallet 500.

Alternatively or additionally, the path proof can be generated by the HD digital wallet 500 itself, such that the path proof can be verified by a third party (e.g., compute device 101 from FIG. 1 or FIG. 2) to confirm that the child public key is correctly associated with a specific child public key in the derivation path of the HD digital wallet 500, without revealing information about the wallet 116, the master seed m, and/or any of its child private/public keys.

In some implementations, each node at each derivation path can represent a unique private/public key pair. For instance, m can represent the master root, / can represent a hierarchy separator, and ' can represent a hardened path. FIG. 5 shows a derivation system that can be applied by the compute device 101 of FIG. 1 or FIG. 2. The derivation system can include, for example, BIPS 32 for which there are two derivation algorithm. In BIPS 32, a derivation path structure is defined in which there are various standards such as BIPS 44 that provide context to the path (e.g., BIPS 44 defines the following structure which can be thought of as a directory folder m/purpose/coin type/account/change/address_index). Child nodes in various derivation paths can be created by using a cryptographic algorithm to derive new private/public key pairs from the master root. Each child node can represent a unique private/public key pair, which can be used to generate a new cryptocurrency address or account. This allows for greater flexibility in managing multiple accounts or addresses, while still maintaining a single master seed for backup and recovery.

Figure 6:
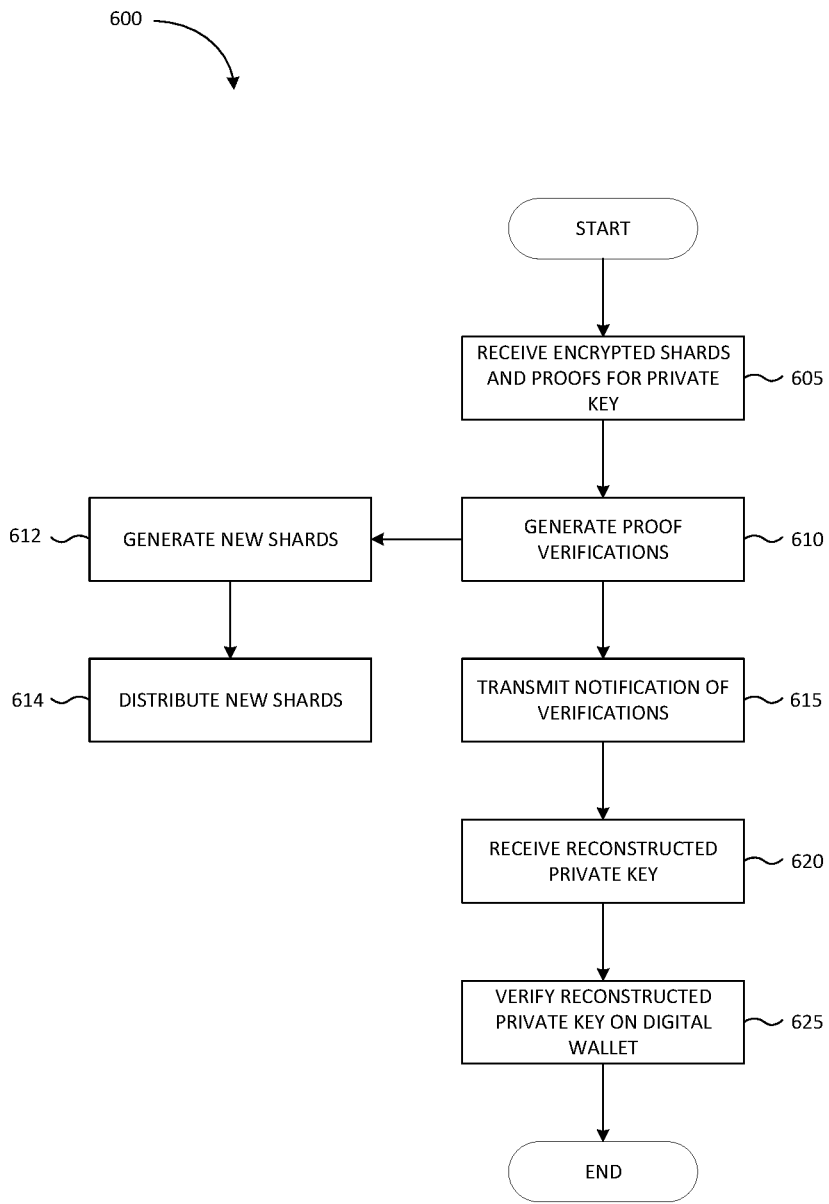
FIG. 6 is a flow diagram of a method for provable backup confirmation of a private key for a digital wallet using shared keys, according to one or more embodiments.

FIG. 6 is a flow diagram of a method 600 for provable backup confirmation of a private key for a digital wallet using shared keys, according to one or more embodiments.

In some implementations, the method 600 can be performed at a compute device acting as a verifier (or custodian). At 605, the method 600 includes receiving, from each compute device that is from at least a quorum of compute devices, (1) an encrypted shard from a set of encrypted shards associated with a private key of a digital wallet and (2) a cryptographic proof from a set of cryptographic proofs and that indicates that the compute device can decrypt the encrypted shard using a decryption key associated with that compute device and without revealing a value of the private key for the digital wallet. The private key of the digital wallet can be associated with an asymmetric key pair. In some implementations, the encrypted shard can be generated from a shard from a set of shards that was encrypted using an encryption key for a compute device. In some cases, the encryption key and/or the decryption key for each compute device can be associated with an asymmetric key pair.

At 610, the method 600 includes, generating, for each compute device from at least the quorum of compute devices, a cryptographic proof verification from a set of cryptographic proof verifications based on the encrypted shard for that compute device and an encryption witness for the private key of the digital wallet. In some implementations, the encryption witness can be or include a public key for the digital wallet. The cryptographic proof verification can indicate that the set of shards decrypted from the set of encrypted shards can be combined to reconstruct the private key for the digital wallet. The public key for the digital wallet can be associated with the asymmetric key pair including the private key for the digital wallet.

At 612, the method 600 can include generating, for each compute device from at least the quorum of compute devices, a decrypted shard from a set of decrypted shards from a decryption key. At 614, the method 600 includes periodically distributing the set of decrypted shards among at least the quorum of compute devices and/or a new quorum of compute devices. In some implementations, the decryption key for the digital wallet can be part of the asymmetric key pair that also is associated with the encryption key for the digital wallet.

At 615, the method 600 can include transmitting notifications to each compute device from at least the quorum of compute devices. The notifications can indicate that validity of the proofs and/or encrypted shards from at least the quorum of compute devices.

At 620, the method 600 can include receiving a reconstructed private key from at least the quorum of compute devices for the digital wallet. The reconstructed private key can be generated using the set of shards from at least the quorum of compute devices by the compute device acting as the verifier (or custodian).

At 625, the method 600 can include verifying the reconstructed private key by attempting to access assets in the digital wallet and/or unlocking the digital wallet. In response to verification, the reconstructed private key can be given to the owner of the digital wallet.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EE-PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, subroutines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus comprising:
a processor; and
a memory operatively coupled to the processor, the memory storing instructions to cause the processor to:
  set a predetermined count of compute devices in at least a quorum of compute devices;
  select, from a plurality of compute devices and based on the predetermined count of compute devices, at least the quorum of compute devices;
  generate a polynomial having (1) a degree that is based on the predetermined count of compute devices and (2) a set of coefficients that are randomly generated;
  produce a plurality of shards based on a plurality of points on a curve defined by the polynomial;
  cause the plurality of shards to be sent to each compute device from at least the quorum of compute devices;
  in response to causing the plurality of shards to be sent to each compute device from at least the quorum of compute devices, receive, from each compute device that is from at least the quorum of compute devices, (1) an encrypted shard from a plurality of encrypted shards associated with a private key for a digital wallet, the encrypted shard generated from a shard that is from the plurality of shards and that was encrypted using an encryption key for that compute device, and (2) a cryptographic proof (a) from a plurality of cryptographic proofs, (b) being based on an encryption witness (i) for the private key for the digital wallet and (ii) determined by performing a group operation based on the private key for the digital wallet, and (c) indicating (i) that the compute device can decrypt the encrypted shard using a decryption key associated with that compute device and (ii) without revealing a value of the private key for the digital wallet; and generate, for each compute device from at least the quorum of compute devices, a cryptographic proof verification from a plurality of cryptographic proof verifications based on the encrypted shard for that compute device and the encryption witness, the cryptographic proof verification indicating that the plurality of shards decrypted from the plurality of encrypted shards can be combined to reconstruct the private key for the digital wallet.

2. The apparatus of claim 1, wherein the cryptographic proof verification from the plurality of cryptographic proof verifications further indicates that at least a quorum of encrypted shards from the plurality of encrypted shards can be combined to generate an encrypted private key for the digital wallet without decryption of the plurality of encrypted shards.

3. The apparatus of claim 2, wherein:

the encrypted private key is generated from an encryption of the private key for the digital wallet using an encryption key for the digital wallet and that is associated with a decryption key for the digital wallet, the cryptographic proof verification is a first cryptographic proof verification, the plurality of cryptographic proof verifications is a first plurality of cryptographic proof verifications, and the memory stores instructions to further cause the processor to:

generate, for each compute device from at least the quorum of compute devices, a decrypted shard from a plurality of decrypted shards from the decryption key for the digital wallet, the plurality of decrypted shards is periodically distributed among at least the quorum of compute devices;

receive, from each compute device from at least the quorum of compute devices, a second cryptographic proof from a plurality of second cryptographic proofs indicating that the plurality of decrypted shards can reconstruct the decryption key for the digital wallet; and generate, for each compute device from at least the quorum of compute devices, a second cryptographic proof verification from a plurality of second cryptographic proof verifications based on the second cryptographic proof for that compute device, the second cryptographic proof verification indicating that the encrypted private key for the digital wallet can be decrypted using the decryption key for the digital wallet that was reconstructed using the plurality of decrypted shards.

4. The apparatus of claim 1, wherein the memory stores instructions to further cause the processor to:

generate, for one or more compute devices from at least the quorum of compute devices, a digital attestation (1) based on (a) the cryptographic proof verification for the one or more compute devices and (b) a private key of an asymmetric key pair for that compute device and (2) that indicates a reference to a public key for the digital wallet.

5. The apparatus of claim 1, wherein:

at least the quorum of compute devices is at least a first quorum of compute devices, and each encrypted shard from the plurality of encrypted shards is divided into a new set of encrypted shards from a plurality of new sets of encrypted shards, the plurality of new sets of encrypted shards is associated with the private key for the digital wallet, each new set of encrypted shards from the plurality of new sets of encrypted shards is periodically distributed, prior to a future division of each new encrypted shard from each new set of encrypted shards, (1) among at least the first quorum of compute devices, (2) to at least a second quorum of compute devices from the plurality of compute devices that is different from at least the first quorum of compute devices, or (3) to at least a third quorum of compute devices from the plurality of compute devices, at least the third quorum of compute devices including one or more compute devices from at least the first quorum of compute devices and at least the second quorum of compute devices.

6. The apparatus of claim 1, wherein each cryptographic proof from the plurality of cryptographic proofs is a zero-knowledge proof (ZKP).

7. The apparatus of claim 1, wherein:

the encrypted shard from the plurality of encrypted shards for each compute device from at least the quorum of compute devices is included in a data element from a plurality of data elements recorded on a public platform, for each compute device from at least the quorum of compute devices:

the cryptographic proof from the plurality of cryptographic proofs includes a hash value from a plurality of hash values that is computed based on a hash of the data element and a timestamp indicating that the cryptographic proof for that compute device is generated after the encrypted shard for that compute device was recorded on the public platform, and the memory stores instructions to further cause the processor to:

generate, for each compute device from at least the quorum of compute devices, the cryptographic proof verification from the plurality of cryptographic proof verifications that is based on the cryptographic proof and the hash value for that compute device and that further confirms that the cryptographic proof for that compute device is generated after the data element associated with the encrypted shard for that compute device was recorded the public platform.

8. The apparatus of claim 7, wherein the public platform is a blockchain.

9. The apparatus of claim 1, wherein prior to receiving the encrypted shard from the plurality of encrypted shards, the memory stores instructions to cause the processor to:

set a predetermined threshold of shards; and select, from the plurality of compute devices, at least the quorum of compute devices based on the predetermined threshold of shards, each compute device from the plurality of compute devices having at least one encrypted shard from the plurality of encrypted shards.

10. The apparatus of claim 1, wherein:

the cryptographic proof verification from the plurality of cryptographic proof verifications indicates validity of a public key of an asymmetric key pair for that compute device; and the memory stores instructions to further cause the processor to:

generate, for one or more compute devices from at least the quorum of compute devices, a digital attestation from a plurality of digital attestations based on the cryptographic proof verification for the one or more compute devices and that indicates a reference to a public key for the digital wallet, and transmit the plurality of digital attestations to a public platform such that the digital attestation associated with the compute device that owns the digital wallet can prove that the public key from the cryptographic proof for that compute device is the public key for the digital wallet.

11. The apparatus of claim 1, wherein the instructions to cause the processor to generate the cryptographic proof verification include instructions to cause the processor to:

generate a challenge based on a hash of the encryption witness;

in response to generating the challenge, receive a response from the compute device associated with that encrypted shard; and generate the cryptographic proof verification based on the challenge and the response.

12. An apparatus comprising:

a processor; and a memory operatively coupled to the processor, the memory storing instructions to cause the processor to:

set a predetermined count of compute devices in at least a quorum of compute devices;

select, from a plurality of compute devices and based on the predetermined count of compute devices, at least the quorum of compute devices;

generate a polynomial having (1) a degree that is based on the predetermined count of compute devices and (2) a set of coefficients that are randomly generated;

produce a plurality of shards based on a plurality of points on a curve defined by the polynomial;

cause the plurality of shards to be sent to each compute device from at least the quorum of compute devices;

in response to causing the plurality of shards to be sent to each compute device from at least the quorum of compute devices, receive, from each compute device from at least the quorum of compute devices, (1) an encrypted shard from a plurality of encrypted shards associated with (a) a private key of a digital wallet and (b) the plurality of shards and (2) a first cryptographic proof (a) from a plurality of first cryptographic proofs, (b) being based on an encryption witness for the private key, the encryption witness being determined by performing a group operation based on the private key, and (c) indicating that that compute device can decrypt the encrypted shard;

generate, for each compute device from at least the quorum of compute device, a first cryptographic proof verification from a plurality of first cryptographic proof verifications based on the encrypted shard for that compute device and the encryption witness for the private key, the first cryptographic proof verification indicating that the plurality of encrypted shards can be combined to reconstruct an encrypted private key for the digital wallet without decryption of the plurality of encrypted shards;

generate, for each compute device from at least the quorum of compute devices, a decrypted shard from a plurality of decrypted shards from a decryption key for the digital wallet, the plurality of decrypted shards being periodically distributed among at least the quorum of compute devices;

receive, from each compute device from at least the quorum of compute devices, a second cryptographic proof from a plurality of second cryptographic proofs indicating that the plurality of decrypted shards can reconstruct the decryption key for the digital wallet; and generate, for each compute device from at least the quorum of compute devices, a second cryptographic proof verification from a plurality of second cryptographic proof verifications based on the second cryptographic proof for that compute device indicating that the encrypted private key for the digital wallet can be decrypted using the decryption key that was reconstructed using the plurality of decrypted shards.

13. The apparatus of claim 12, wherein:

at least the quorum of compute devices is at least a first quorum of compute devices, and the plurality of decrypted shards is periodically distributed to (1) at least a second quorum of compute devices from the plurality of compute devices that is different from at least the first quorum of compute devices or (2) to at least a third quorum of compute devices from the plurality of compute devices, at least the third quorum of compute devices including one or more compute devices from at least the first quorum of compute devices and at least the second quorum of compute devices.

14. The apparatus of claim 12, wherein:

the first cryptographic proof verification from the plurality of first cryptographic proof verifications indicates validity of a public key of an asymmetric key pair for that compute device, and the memory stores instructions to further cause the processor to:

generate, for each compute device from at least the quorum of compute devices, a digital attestation from a plurality of digital attestations based on the first cryptographic proof verification for that compute device and indicating a reference to a public key for the digital wallet; and transmit the plurality of digital attestations to a public platform such that the digital attestation associated with the compute device that owns the digital wallet can prove that the public key from the first cryptographic proof for that compute device is the public key for the digital wallet.

15. The apparatus of claim 12, wherein the memory stores instructions to further cause the processor to:

derive the private key for the digital wallet to generate a plurality of child private keys, the plurality of child private keys distributed among each compute device from at least the quorum of compute devices;

receive, from each compute device from at least the quorum of compute devices, a derivation path that is from a plurality of derivation paths that is used to derive the private key for the digital wallet into a child private key (1) for that compute device and (2) from the plurality of child private keys; and generate, for each compute device from at least the quorum of compute devices, a path proof from a plurality of path proofs based on the derivation path for that compute device and that indicates that a child public key is associated with the child private key derived from that derivation path.

16. The apparatus of claim 12, wherein:

at least the quorum of compute devices is at least a first quorum of compute devices, and each encrypted shard from the plurality of encrypted shards is divided into a new set of encrypted shards from a plurality of new sets of encrypted shards, the plurality of new sets of encrypted shards is associated with the private key for the digital wallet, each new set of encrypted shards from the plurality of new sets of encrypted shards is periodically distributed, prior to a future division of each new encrypted shard from each new set of encrypted shards, (1) among at least the first quorum of compute devices, (2) to at least a second quorum of compute devices from the plurality of compute devices that is different from at least the first quorum of compute devices, or (3) to at least a third quorum of compute devices from the plurality of compute devices, at least the third quorum of compute devices including one or more compute devices from at least the first quorum of compute devices and at least the second quorum of compute devices.

17. The apparatus of claim 12, wherein each first cryptographic proof from the plurality of first cryptographic proofs and each second cryptographic proof from the plurality of second cryptographic proofs is a zero-knowledge proof (ZKP).

18. The apparatus of claim 12, wherein the memory stores instructions to further cause the processor to:

generate, for each compute device from at least the quorum of compute devices, transaction data from a plurality of transaction data based on the encrypted shard for that compute device;

transmit each transaction data from the plurality of transaction data to a public platform to be posted on the public platform, each transaction data from the plurality of transaction data including a timestamp indicating a time in which that transaction data was posted on the public platform; and for each compute device from at least the quorum of compute devices, the first cryptographic proof verification from the plurality of first cryptographic proof verifications based on the first cryptographic proof and the timestamp of the transaction data for that compute device and indicating that the transaction data for that compute device was posted on the public platform before the first cryptographic proof was generated.

19. A non-transitory, processor-readable medium storing instructions that executed by a processor, cause the processor to:

set a predetermined count of compute devices in at least a quorum of compute devices;

select, from a plurality of compute devices and based on the predetermined count of compute devices, at least the quorum of compute devices;

generate a polynomial having (1) a degree that is based on the predetermined count of compute devices and (2) a set of coefficients that are randomly generated;

produce a plurality of shards based on a plurality of points on a curve defined by the polynomial;

cause the plurality of shards to be sent to each compute device from at least the quorum of compute devices;

in response to causing the plurality of shards to be sent to each compute device from at least the quorum of compute devices, receive, from each compute device that is from at least the quorum of compute devices, (1) an encrypted shard from a plurality of encrypted shards associated with a private key for a digital wallet, the encrypted shard generated from a shard from the plurality of shards that was encrypted using an encryption key for that compute device, and (2) a cryptographic proof from a plurality of cryptographic proofs, the cryptographic proof for that compute device (a) being based on an encryption witness for the private key and (b) indicating that that compute device can decrypt the encrypted shard from the plurality of encrypted shards and for that compute device using a decryption key associated with that compute device;

generate, for each compute device from at least the quorum of compute devices, a cryptographic proof verification from a plurality of cryptographic proof verifications based on the encrypted shard for that compute device and the encryption witness, the cryptographic proof verification for that compute device indicating that the plurality of shards decrypted from the plurality of encrypted shards can be combined to reconstruct the private key for the digital wallet; and transmit a notification including the plurality of cryptographic proof verifications to at least the quorum of compute devices.

20. The non-transitory, processor-readable medium of claim 19, wherein verifying the reconstructed private key includes attempting to unlock the digital wallet using the reconstructed private key.

\* \* \* \* \*